United States Patent
Hayashi et al.

(10) Patent No.: US 10,183,432 B2
(45) Date of Patent: *Jan. 22, 2019

(54) INNER LINER FOR PNEUMATIC TIRE, METHOD FOR PRODUCING THE SAME, AND PNEUMATIC TIRE

(75) Inventors: Nahoto Hayashi, Kurashiki (JP); Masao Hikasa, Kibi chuo-cho (JP); Yusuke Tanaka, Kamisu (JP); Hideki Kitano, Tokyo (JP); Takatsugu Tanaka, Tokyo (JP); Tetsuo Amamoto, Tokyo (JP)

(73) Assignees: Kuraray Co., Ltd., Okayama (JP); BRIDGESTONE CORPORATION, Chuo-ku, Tokyo (JP)

(*) Notice: Subject to any disclaimer, the term of this patent is extended or adjusted under 35 U.S.C. 154(b) by 139 days.

This patent is subject to a terminal disclaimer.

(21) Appl. No.: 14/122,353

(22) PCT Filed: May 29, 2012

(86) PCT No.: PCT/JP2012/063809
§ 371 (c)(1),
(2), (4) Date: Nov. 26, 2013

(87) PCT Pub. No.: WO2012/165441
PCT Pub. Date: Dec. 6, 2012

(65) Prior Publication Data
US 2014/0124114 A1 May 8, 2014

(30) Foreign Application Priority Data
May 31, 2011 (JP) .................................. 2011-121993

(51) Int. Cl.
*B60C 5/14* (2006.01)
*B60C 1/00* (2006.01)
(Continued)

(52) U.S. Cl.
CPC ............ *B29C 47/06* (2013.01); *B60C 1/0008* (2013.01); *B60C 5/14* (2013.01); *C08F 8/12* (2013.01);
(Continued)

(58) Field of Classification Search
CPC .. B60C 5/12; B60C 5/14; B60C 5/142; B60C 1/0008
See application file for complete search history.

(56) References Cited

U.S. PATENT DOCUMENTS 4,503,121 A * 3/1985 Robeson ............ B29D 11/0073
126/569
4,585,701 A * 4/1986 Bartoszek ............... B29B 17/00
264/173.16
(Continued)

FOREIGN PATENT DOCUMENTS

JP         6-40207 A        2/1994
JP      2002-524317 A       8/2002
(Continued)

OTHER PUBLICATIONS

Extended European Search Report dated Jul. 24, 2014 in European Patent Application No. 12794028.6.

*Primary Examiner* — Justin R Fischer
(74) *Attorney, Agent, or Firm* — Sughrue Mion, PLLC

(57) ABSTRACT

Provided is an inner liner for a pneumatic tire including no less than 8 resin-layers, the resin-layer having a layer A constituted with a resin composition containing a resin having gas barrier properties, and a layer B that is adjacent to the layer A and is constituted with a resin composition containing an elastomer, an extensional viscosity $\eta_A$ of the resin composition of the layer A, and an extensional viscosity $\eta_B$ of the resin composition of the layer B as determined at a predetermined temperature both being no less than 1,000 Pa·s, and an extensional viscosity ratio $\eta_A/\eta_B$ being no less than 0.2 and no greater than 10.

13 Claims, 1 Drawing Sheet

(51) Int. Cl.
*B29C 47/06* (2006.01)
*C08F 8/12* (2006.01)
*C08L 23/08* (2006.01)

(52) U.S. Cl.
CPC .... *B60C 2005/145* (2013.01); *C08F 2800/10* (2013.01); *C08L 23/0861* (2013.01)

(56) References Cited

U.S. PATENT DOCUMENTS

| | | | |
|---|---|---|---|
| 4,898,784 A * | 2/1990 | Sanders | B32B 7/12 |
| | | | 428/412 |
| 4,928,741 A | 5/1990 | Rye et al. | |
| 5,202,074 A * | 4/1993 | Schrenk | B32B 37/153 |
| | | | 264/241 |
| 5,780,573 A * | 7/1998 | Iwata | C08G 18/0895 |
| | | | 528/272 |
| 6,203,868 B1 * | 3/2001 | Bonk | A43B 1/0072 |
| | | | 428/35.4 |
| 6,397,912 B1 | 6/2002 | Watanabe et al. | |
| 6,579,601 B2 | 6/2003 | Kollaja et al. | |
| 6,582,786 B1 | 6/2003 | Bonk et al. | |
| 6,846,534 B2 | 1/2005 | Bonk et al. | |
| 9,873,238 B2 | 1/2018 | Tai et al. | |
| 2001/0008687 A1 | 7/2001 | Kollaja et al. | |
| 2004/0013834 A1 | 1/2004 | Bonk et al. | |
| 2009/0242094 A1 * | 10/2009 | Kato | B60C 1/0008 |
| | | | 152/565 |
| 2011/0024015 A1 * | 2/2011 | Takahashi | B60C 1/0008 |
| | | | 152/510 |
| 2013/0186539 A1 | 7/2013 | Takahashi et al. | |

FOREIGN PATENT DOCUMENTS

| | | |
|---|---|---|
| JP | 2003-26931 A | 1/2003 |
| JP | 2003-512201 A | 4/2003 |
| JP | 2009-274680 A | 11/2009 |
| WO | 00/15067 A1 | 3/2000 |
| WO | 01/28769 A1 | 4/2001 |
| WO | 2007/081323 A1 | 7/2007 |
| WO | 2011/068104 A1 | 6/2011 |
| WO | 2012/042679 A1 | 4/2012 |

\* cited by examiner

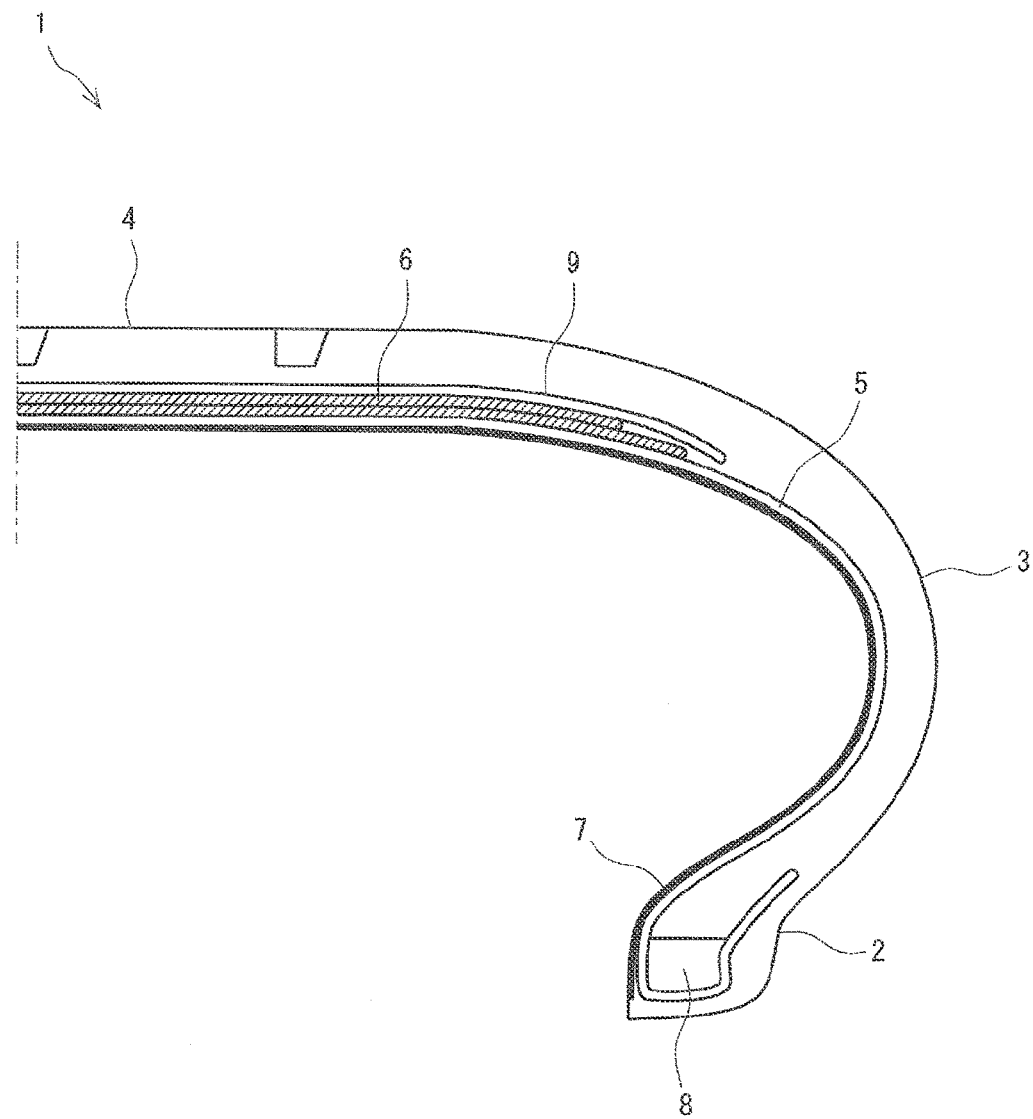

INNER LINER FOR PNEUMATIC TIRE, METHOD FOR PRODUCING THE SAME, AND PNEUMATIC TIRE

CROSS REFERENCE TO RELATED APPLICATIONS

This application is a National Stage of International Application No. PCT/JP2012/063809, filed on May 29, 2012, which claims priority from Japanese Patent Application No. 2011-121993, filed on May 31, 2011, the contents of all of which are incorporated herein by reference in their entirety.

TECHNICAL FIELD

The present invention relates to an inner liner for a pneumatic tire, the inner liner having no less than 8 resin-layers, and a method for producing the same and a pneumatic tire. More particularly, the present invention relates to an inner liner having superior gas barrier properties, melt moldability and durability, and a method for producing the same and a pneumatic tire having such an inner liner.

TECHNICAL FIELD

Nowadays, laminated films having an ethylene-vinyl alcohol copolymer layer have been used in applications such as packaging materials for food, medical applications and the like, taking advantages of their superior gas barrier properties, stretchability, thermoformability and the like. Recently, for the purpose of improving various types of performances such as gas barrier properties, various multilayered structures have been proposed in which a plurality of resin-layers are laminated, each layer having a thickness of micron or submicron order.

Conventional multilayered structures developed so far in which a plurality of resin-layers of an ethylene-vinyl alcohol copolymer are laminated include, for example: (1) an elastomeric barrier film in which at least ten layers of a microlayer polymer composite formed from a fluid barrier material such as an ethylene-vinyl alcohol copolymer, and an elastomer material such as thermoplastic polyurethane are alternately laminated (see Japanese Unexamined Patent Application (Translation of PCT Application), Publication No. 2002-524317); (2) a multilayer film alternately including layers of a hard polymer material such as an ethylene-vinyl alcohol copolymer and a flexible polymer material (see Japanese Unexamined Patent Application (translation of PCT Application), Publication No. 2003-512201), and the like.

The multilayered structures as described above are generally molded by a coextrusion process or the like. In this regard, each layer of the multilayered structure has a small thickness and is a laminate having multilayers; therefore, melt molding of each layer and the entirety is not easy. When the melt moldability is not favorable, the thickness of each layer being uneven may lead to deteriorated durability, or failure in achieving sufficient gas barrier properties. However, in the conventional multilayered structures (1) and (2) described above, any particular measure for improving the melt moldability has not been taken.

On the other hand, a rubber composition containing a butyl rubber, a halogenated butyl rubber or the like as a principal material has been conventionally used for an inner liner provided as an air barrier layer on the inner face of a tire in order to retain an internal pressure of the tire. However, the thickness of the inner liner should be about 1 mm when such a rubber composition is used for an inner liner since the rubber composition containing such a butyl based rubber as a principal material has poor air barrier properties. As a result, the mass of the inner liner reaches approximately 5% of the total mass of the tire, thereby hampering improvement of the fuel efficiency of automobiles, agricultural vehicles, construction vehicles and the like by decreasing the mass of tires.

Accordingly, a technique in which an ethylene-vinyl alcohol copolymer that is superior in gas barrier properties and the like is used for producing an inner liner as described above has been also developed (see Japanese Unexamined Patent Application, Publication No. H6-40207). However, when the ethylene-vinyl alcohol copolymer is used as an inner liner, a modulus of elasticity higher than those of butyl rubbers, etc., which have been conventionally used for tires, leads to disadvantages such as fracturing and generation of cracks due to flexion of the tire during running, although significant effects of improving internal pressure retainability of tires can be achieved owing to superior gas barrier properties.

In view of these disadvantages, use of a multilayered structure that includes layers containing an ethylene-vinyl alcohol copolymer as an inner liner may be conceived. However, in order to use the multilayered structure as an inner liner for a pneumatic tire, it is necessary to further enhance the durability and gas barrier properties such that the tire can endure the environment in use.

PRIOR ART DOCUMENTS

Patent Documents

Patent Document 1: Japanese Unexamined Patent Application (translation of PCT Application), Publication No. 2002-524317

Patent Document 2: Japanese Unexamined Patent Application (translation of PCT Application), Publication No. 2003-512201

Patent Document 3: Japanese Unexamined Patent Application, Publication No. H6-40207

PATENT DOCUMENT

Problems to be Solved by the Invention

The present invention was made in view of these disadvantages, and an object of the invention is to provide an inner liner for a pneumatic tire that is excellent in melt moldability and consequently has superior gas barrier properties, and is capable of maintaining characteristics such as gas barrier properties even when used with deformation such as stretching or flexion. Further provided is a pneumatic tire having such an inner liner. Additionally, other object of the invention is to provide a method for producing an inner liner having such characteristics, while preventing an increase in production costs.

Means for Solving the Problems

An aspect of the invention made for solving the foregoing problems is an inner liner for a pneumatic tire,
the inner liner including no less than 8 resin-layers,
the resin-layer having a layer A constituted with a resin composition containing a resin having gas barrier properties, and a layer B that is adjacent to the layer A and is constituted with a resin composition containing an elastomer, an extensional viscosity $\eta_A$ of the resin composition of the layer A, and an extensional viscosity $\eta_B$ of the resin composition of the layer B as determined under the following measurement conditions both being no less than 1,000 Pa·s, and an extensional viscosity ratio $\eta_A/\eta_B$ being no less than 0.2 and no greater than 10.

Measurement Conditions

Temperature: a temperature greater by 25° C. than the higher melting between a melting point of the resin composition of the layer A and a melting point of the resin composition of the layer B (outflow-starting temperature for a resin composition not having a melting point)

Stretching speed: 500 (1/sec)

Since the inner liner has a multilayered structure including the layer A and the layer B, superior gas barrier properties can be achieved. In addition, when the extensional viscosity of the resin composition of the layer A and the resin composition of the layer B constituting the layered structure, and a ratio of the extensional viscosities in the inner liner are limited, superior melt moldability of each layer and the entirety is achieved even in a case in which each one layer is provided to have a thickness of a micron order or a submicron order. Therefore, according to the inner liner, superior durability can be attained, and characteristics such as gas barrier properties can be maintained even when used with deformation such as stretching or flexion.

It is preferred that the layer A and the layer B are alternately laminated. By thus alternately laminating the layer A and the layer B, superior adhesiveness can be each achieved between the layers. As a result, interlayer adhesiveness of the inner liner, in turn, gas barrier properties, durability, and the like can be more improved.

The average thickness of a single layer of at least one selected from the layer A and the layer B is preferably no less than 0.01 μm and no greater than 10 μm. When the average thickness of the layer A and/or layer B falls within the above range, the number of layers can be increased even if the entirety of the inner liner has an identical thickness, and consequently, the gas barrier properties, durability and the like of the inner liner can be further improved.

A product $\eta_A \cdot T_A$ of the extensional viscosity $\eta_A$ of the resin composition of the layer A and the average thickness $T_A$ of the one layer thereof, and a product $\eta_B \cdot T_B$ of the extensional viscosity $\eta_B$ of the resin composition of the layer B and the average thickness $T_B$ of the one layer thereof are both preferably no less than 500 Pa·s·μm and no greater than 500,000 Pa·s·μm. When the product of the extensional viscosity of the resin composition of each layer and the average thickness of the one layer thereof thus falls within the above range, the melt moldability can be further improved.

A ratio $(\eta_A \cdot T_A)/(\eta_B \cdot T_B)$ of the product $\eta_A \cdot T_A$ to the product $\eta_B \cdot T_B$ is preferably no less than 0.01 and no greater than 100. When the ratio of the products in the layer A and the layer B thus falls within a specific range, the melt moldability can be further improved such as enabling each layer to be controlled so as to have a desired thickness, in molding by coextrusion, for example.

The inner liner has a thickness of preferably no less than 0.1 μm and no greater than 1,000 μm. When the inner liner has a thickness falling within the above range, along with the effects achievable by the average thickness of the layer A and/or layer B falling within the range as described above, the gas barrier properties, melt moldability, durability and the like can be further improved while maintaining applicability to the pneumatic tire.

The resin having gas barrier properties is preferably an ethylene-vinyl alcohol copolymer. When the ethylene-vinyl alcohol copolymer is used as the resin having gas barrier properties, the gas barrier properties of the inner liner can be further enhanced.

A content of the ethylene unit of the ethylene-vinyl alcohol copolymer is preferably no less than 3 mol % and no greater than 70 mol %. When the content of the ethylene unit thus falls within the above range, the gas barrier properties of the inner liner are enhanced, and additionally melt moldability can be improved, whereby durability and the like can be improved due to the superior melt moldability.

The ethylene-vinyl alcohol copolymer preferably has a degree of saponification of no less than 80 mol %. When the degree of saponification thus falls within the above range, the gas barrier properties of the inner liner can be further enhanced, and the moisture resistance can be improved. In addition, when the degree of saponification falls within the above range, interlayer adhesiveness to the layer B, and in turn, durability and the like can be improved.

The ethylene-vinyl alcohol copolymer preferably has at least one selected from the group consisting of the following structural units (I) and (II), and a content of the structural unit (I) or (II) with respect to all structural units is preferably no less than 0.5 mol % and no greater than 30 mol %.

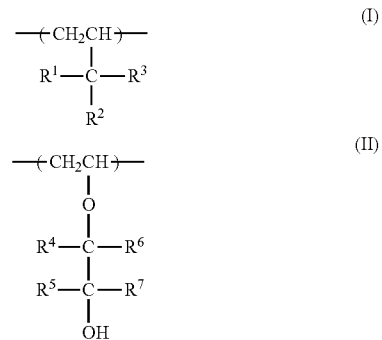

In the above formula (I), $R^1$, $R^2$ and $R^3$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group; with the proviso that two among $R^1$, $R^2$ and $R^3$ are optionally bound, unless the two both represent a hydrogen atom; and that any $R^1$, $R^2$ and $R^3$ that is an aliphatic hydrocarbon group having 1 to 10 carbon atoms, an alicyclic hydrocarbon group having 3 to 10 carbon atoms or an aromatic hydrocarbon group having 6 to 10 carbon atoms optionally has a hydroxyl group, a carboxyl group or a halogen atom.

In the above formula (II), $R^4$, $R^5$, $R^6$ and $R^7$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group; with the proviso that $R^4$ and $R^5$, or $R^6$ and $R^7$ are optionally bound, unless both $R^4$ and $R^5$ or both $R^6$ and $R^7$ represent a hydrogen atom; and that any of $R^4$, $R^5$, $R^6$ and $R^7$ that is an aliphatic hydrocarbon group having 1 to 10 carbon atoms, an alicyclic hydrocarbon group having 3 to 10 carbon atoms or an aromatic hydrocarbon group having 6 to 10 carbon atoms optionally has a hydroxyl group, an alkoxy group, a carboxyl group or a halogen atom.

Accordingly, when the ethylene-vinyl alcohol copolymer of the layer A has the structural unit (I) or (II) at a content falling within the above range, flexibility and processing characteristics of the resin composition constituting the layer A are improved, and the interlayer adhesiveness, stretchability, melt moldability and the like of the inner liner can be improved. Particularly, due to the improvement of the flexibility of the resin composition constituting the layer A at low temperatures, durability of the inner liner at low temperatures can be improved.

The elastomer is preferably at least one selected from the group consisting of a polystyrene based elastomer, a polyolefin based elastomer, a polydiene based elastomer, a polyvinyl chloride based elastomer, a chlorinated polyethylene based elastomer, a polyurethane based elastomer, a polyester based elastomer, a polyamide based elastomer and a fluorine-contained resin based elastomer. When any one of the above polymers is used as the elastomer, the stretchability of the inner liner can be effectively increased, whereby further improvement of the flex resistance is enabled.

The layer A and the layer B are preferably obtained through crosslinking by irradiation with an active energy ray. The irradiation with an active energy ray to permit crosslinking in the layer A and the layer B enables the interlayer adhesiveness and durability of the inner liner to be improved.

In the inner liner, it is preferred that a binding reaction is involved at an interface between the layer A and the layer B. Accordingly, by linking via a covalent bond or ionic bond between a molecule of the resin composition constituting the layer A and a molecule of the resin composition constituting the layer B, more superior interlayer adhesiveness can be attained. As a result, the gas barrier properties, durability and the like of the inner liner can be further improved.

The pneumatic tire of the present invention is characterized by having the inner liner. Due to having the inner liner, the pneumatic tire can attain superior durability, and characteristics such as gas barrier properties can be maintained.

In addition, other aspect of the present invention made for solving the foregoing problems provides a method for producing the inner liner, the method including forming the inner liner by a multilayer coextrusion process using a resin composition containing a resin having gas barrier properties, and a resin composition containing an elastomer. According to the method for producing an inner liner, the inner liner that is superior in melt moldability of each layer and the entirety, and consequently has superior gas barrier properties, durability and the like can be produced easily and certainly, while preventing an increase in production costs.

Effects of the Invention

As explained in the foregoing, the inner liner of the present invention is superior in melt moldability and consequently has superior gas barrier properties, and even when used with deformation such as stretching or flexion, characteristics such as gas barrier properties can be maintained. In addition, according to the method for producing an inner liner of the present invention, the inner liner having such characteristics can be produced easily and certainly while preventing an increase in production costs.

BRIEF DESCRIPTION OF THE DRAWINGS

FIG. 1 shows a schematic partial cross-sectional view illustrating a pneumatic tire having an inner according to one embodiment of the present invention.

DESCRIPTION OF EMBODIMENTS

Hereinafter, embodiments of the inner liner and the method for producing the same, and the pneumatic tire of the present invention will be described in detail.

Inner Liner

The inner liner is used in a pneumatic tire, and is a multilayered structure having no less than 8 resin-layers. The inner liner includes as the resin-layer, a layer A constituted with a resin composition containing a resin having gas barrier properties, and a layer B constituted with a resin composition containing an elastomer.

Hereinafter, the layered structure of the inner liner, the extensional viscosity of the layer A and the layer B, the layer A, the layer B, a relationship between the layer A and the layer B, and the production method will be explained in this order.

Layered Structure of the Inner Liner

The inner liner has no less than 8 resin-layers. Due to the configuration in which no less than 8 resin-layers are laminated, continuous development of defects such as pinholes and breakages can be prevented, and as a result, the inner liner has superior characteristics such as gas barrier properties and durability resulting from the structure per se. In these regards, and in light of the production, total number of the resin-layers is preferably no less than 10, more preferably no less than 15, and particularly preferably no less than 18. In addition, for similar reasons, the number of each of the layer A and the layer B is preferably no less than 4, more preferably no less than 6, and still more preferably no less than 8.

The resin-layer includes at least two types of layers, the layer A and the layer B, and other layer C and the like may be further included. By laminating at least 8 layers in total of two or more types of the layers including the layer A constituted with a resin composition containing a resin having gas barrier properties and the layer B constituted with a resin composition containing an elastomer, a multilayered structure having superior gas barrier properties resulting from the layer A, and stretchability and thermoformability resulting from the layer B in combination can be provided. In addition, the inner liner can maintain gas barrier properties even if used with repeated deformation such as stretching or flexion imposed, owing to the laminated configuration that includes the layer A and the layer B.

It is to be noted that the layer A may be constituted with either a single resin composition, or a plurality of types of resin compositions as long as a resin having gas barrier properties is included. Moreover, the layer B may be also constituted with either a single resin composition, or a plurality of types of resin compositions containing an elastomer, similarly to the layer A.

The order of lamination of the layer A and the layer B is not particularly limited as long as a structure having at least a site including the layer A and the layer B being adjacent with each other is formed. For example, the order of lamination such as:

(1) A, B, A, B . . . A, B (i.e., $(AB)_n$);
(2) A, B, A, B . . . A (i.e., $(AB)_n A$);
(3) B, A, B, A . . . B (i.e., $(BA)_n B$); and
(4) A, A, B, B . . . B, B (i.e., $(AABB)_n$)

may be employed. In addition, when the other C layer is included, for example, the order of lamination such as (5) A, B, C . . . A, B, C (i.e., $(ABC)_n$) may be employed.

In particular, according to preferable orders of lamination of the layer A and layer B, the layer A and the layer B are alternately laminated as in the above (1), (2) or (3). Thus alternately laminated structure makes the inner liner have superior gas barrier properties and flexibility. Furthermore, strong adhesive force between the layer A and the layer B described later can be affected at the entirety of the interlayer, whereby defects such as interlayer delamination can be significantly reduced. As a result, the effects of the invention, i.e., improvement of characteristics of the inner liner such as gas barrier properties and durability of the characteristics can be more efficiently achieved.

The lower limit of the thickness of the inner liner is preferably 0.1 µm, more preferably 1 µm, and still more preferably 5 µm. On the other hand, the upper limit of the thickness of the inner liner is preferably 1,000 µm, more preferably 700 µm, and still more preferably 500 µm. When the thickness of the inner liner is less than the lower limit described above, the strength becomes insufficient, whereby use of the inner liner may be difficult. To the contrary, when the thickness of the inner liner is beyond the upper limit described above, flexibility, moldability and the like may be deteriorated, whereby an increase in production costs may be brought. Note that the thickness of the inner liner may be determined by measuring the thickness of the cross section at arbitrarily selected points of the inner liner.

The lower limit of the average thickness of the layer A in terms of a single layer is preferably 0.01 µm, more preferably 0.05 µm, and still more preferably 0.1 µm. On the other hand, the upper limit of the average thickness of the layer A in terms of a single layer is preferably 10 µm, more preferably 7 µm, still more preferably 5 µm, and particularly preferably 2 µm. When the average thickness of the layer A in terms of a single layer is less than the lower limit described above, molding with a uniform thickness becomes difficult, whereby the gas barrier properties and their durability of the inner liner may be deteriorated. To the contrary, when the average thickness of the layer A in terms of a single layer is beyond the upper limit described above, it becomes difficult to increase the number of layers if the entirety of the inner liner has an identical average thickness, whereby the effect of improving gas barrier properties due to the multilayer as described above may not be effected, and stretchability and melt moldability of the inner liner may be deteriorated. It is to be noted that the average thickness of the layer A in terms of a single layer refers to a value derived by dividing the total thickness of all layers A included in the inner liner by the number of the layers A.

For similar reasons, the lower limit of the average thickness of the layer B in terms of a single layer is preferably 0.01 µm, more preferably 0.05 µm, and still more preferably 0.1 µm. On the other hand, the upper limit of the average thickness of the layer B in terms of a single layer is preferably 10 µm, more preferably 7 µm, still more preferably 5 µm, and particularly preferably 2 µm. It is to be noted that the average thickness of the layer B in terms of a single layer also refers to a value derived by dividing the total thickness of all layers B included in the inner liner by the number of the layers B.

Extensional Viscosity of the Layer A and the Layer B

An extensional viscosity $\eta_A$ of the resin composition of the layer A, and an extensional viscosity $\eta_B$ of the resin composition of the layer B as determined under the following measurement conditions are both no less than 1,000 Pa·s, preferably no less than 2,000 Pa·s, and more preferably no less than 3,000 Pa·s. On the other hand, the extensional viscosities $\eta_A$ and $\eta_B$ are moth preferably no greater than 50,000 Pa·s, more preferably no greater than 20,000 Pa·s, and still more preferably no greater than 10,000 Pa·s. When the extensional viscosities $\eta_A$ and $\eta_B$ fall within the above range, the melt moldability of each layer and the entirety is enhanced, and gas barrier properties and/or durability of the resulting inner liner can be improved.

When the extensional viscosities $\eta_A$ and $\eta_B$ are below the lower limit described above, neck-in and shaking of the film may be significant in film formation by extrusion such as lamination with melt coextrusion or melt extrusion, thereby enhancing thickness variation and width reduction of the obtained inner liner (multilayered structure) and each layer before the lamination, and thus it will be impossible to obtain a multilayered structure that is uniform and has a size intended. To the contrary, when the extensional viscosities $\eta_A$ and $\eta_B$ are beyond upper limit described above, film cleavage becomes likely to occur and high-speed film formability is remarkably deteriorated, for example, in the case in which lamination with melt coextrusion or molding with melt extrusion is carried out under conditions with taking up at a high speed, and die swelling becomes likely to occur, whereby obtaining a thin multilayered structure or each layer before the lamination may be difficult. Furthermore, when the extensional viscosities $\eta_A$ and $\eta_B$ are beyond the upper limit described above, a torque applied to the extruder becomes too high, and thus extrusion patch and weld line can be likely to be generated.

Measurement Conditions

Temperature: a temperature higher by 25° C. than the higher melting between a melting point of the resin composition of the layer A and a melting point of the resin composition of the layer B (outflow-starting temperature for a resin composition not having a melting point)

Stretching speed: 500 (1/sec)

Note that, the extensional viscosity as referred to herein means a value determined according to a capillary flow measurement method.

An extensional viscosity ratio $\eta_A/\eta_B$ of the extensional viscosity $\eta_A$ of the resin composition of the layer A to the extensional viscosity $\eta_B$ of the resin composition of the layer B is no less than 0.2 and no greater than 10, preferably no less than 0.3 and no greater than 5, and still more preferably no less than 0.5 and no greater than and 3. When the extensional viscosities of both resin compositions are approximate to one another in this manner, superior melt moldability can be achieved even in the inner liner that includes each one layer having the thickness in the order of micron or submicron. Therefore, according to the inner liner, superior durability can be attained, and characteristics such as gas barrier properties can be maintained even when used with deformation such as stretching or flexion. When the extensional viscosity ratio $\eta_A/\eta_B$ does not fall within the above range, it may be difficult to mold both layers in a favorable state, for example, in attempts to mold both layers by coextrusion, and thus deterioration of the appearance and/or durability may occur.

Moreover, it is preferred that both the extensional viscosities of the resin compositions of the layer A and the layer B at the aforementioned temperature for the measurement and at a stretching speed of 100 (1/sec) and 1,000 (1/sec) fall within the above range, and the extensional viscosity ratio falls within the above range at any of the stretching speed. When the resin composition is used in which the extensional viscosities are thus as defined above even in the case in which the stretching speed employed is 100 (1/sec) and 1,000 (1/sec), the melt moldability of the inner liner can be further improved.

A product $\eta_A \cdot T_A$ of $\eta_A$ and the average thickness $T_A$ of the layer A in terms of a single layer, and a product $\eta_B \cdot T_B$ of the extensional viscosity $\eta_B$ and the average thickness $T_B$ of the layer B in terms of a single layer are both preferably no less than 500 Pa·s·µm and no greater than 500,000 Pa·s·µm, more preferably no less than 1,000 Pa·s·µm and no greater than 100,000 Pa·s·μm, still more preferably no less than 2,000 Pa·s·μm and no greater than 50,000 Pa·s·μm, and particularly preferably no less than 3,000 Pa·s·μm and no greater than 30,000 Pa·s·m. When the product of the extensional viscosity of the resin composition of each layer and the average thickness of the one layer falls within the above range, the melt moldability can be further improved.

The melt molding may be difficult when the thickness of each layer is too small; therefore, it is preferred that the resin composition has an extensional viscosity at a certain level in order to compensate for such an insufficiency. Thus, when the products ($\eta_A \cdot T_A$ and $\eta_B \cdot T_B$) are less the lower limit described above, the melt moldability may be deteriorated, and specifically, the neck-in and shaking of the film may be significant in film formation by extrusion such as lamination with melt coextrusion or melt extrusion, thereby enhancing thickness variation and width reduction of the obtained inner liner and each layer before the lamination, and thus it will be impossible to obtain an inner liner that is uniform and has a size intended. To the contrary, also when the products are beyond the upper limit described above, thermoformability may be deteriorated such as, e.g., an increase of possible occurrence of roughening of the surface of each layer, film cleavage, die swelling, extrusion patch and weld line, and the like.

A ratio $(\eta_A \cdot T_A)/(\eta_B \cdot T_B)$ of the product $\eta_A \cdot T_A$ to the product $\eta_B \cdot T_B$ is preferably no less than 0.01 and no greater than 100, more preferably no less than 0.1 and no greater than 10, and still more preferably no less than 0.2 and no greater than 5. When the ratio of the products in the layer A and the layer B thus falls within the specific range, the melt moldability can be further improved, e.g., leading to an ease in adjustment of each layer to have a desired thickness in molding by coextrusion, for example. When the ratio of the products is out of the range described above, maintaining moldability of both layers at a favorable level may fail such as occurrence of roughening of the surface film cleavage, thickness variation, width reduction, and a decrease of adhesiveness of one layer, and the like.

Layer A

The layer A is constituted with a resin composition containing a resin having gas barrier properties. Since the resin composition constituting the layer A contains a resin having gas barrier properties, the inner liner that is superior in gas barrier properties can be obtained.

The resin having gas barrier properties has a function of preventing permeabilization of gases, specifically has an oxygen transmission rate as determined according to a method described in JIS-K7126 (isopiestic method) under conditions including 20° C. and 65% RH of no greater than 100 mL·20 μm/(m²·day·atm). It should be noted that the oxygen transmission rate of the resin having gas barrier properties used in the present invention is preferably no greater than 50 mL·20 μm/(m²·day·atm), and more preferably no greater than 10 mL·20 μm/(m²·day·atm).

Such a resin having gas barrier properties is exemplified by an ethylene-vinyl alcohol copolymer (hereinafter, may be also referred to as "EVOH"), a polyamide, a polyester, polyvinylidene chloride, an acrylonitrile copolymer, polyvinylidene fluoride, polychlorotrifluoroethylene, polyvinyl alcohol, and the like.

Of these resins having gas barrier properties, polyamide, polyester resins and EVOH are preferred in light of the gas barrier properties, and EVOH is particularly preferred in light of not only gas barrier properties but also melt moldability, adhesiveness with the layer B, and the like.

Polyamide

The polyamide is a polymer having an amide bond, and can be obtained by ring-opening polymerization of a lactam, polycondensation of a dicarboxylic acid with an aminocarboxylic acid or a diamine, or the like.

Examples of the lactam include ε-caprolactam, ω-laurolactam, and the like.

Examples of the aminocarboxylic acid include 6-aminocaproic acid, 11-aminoundecanoic acid, 12-aminododecanoic acid, paraminomethylbenzoic acid, and the like.

Examples of the diamine include tetramethylenediamine, hexamethylenediamine, undecamethylenediamine, dodecamethylenediamine, 2,2,4-trimethylhexamethylenediamine, 2,4,4-trimethylhexamethylenediamine, 5-methylnonamethylenediamine, m-xylylenediamine, p-xylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, and the like.

Examples of the dicarboxylic acid include succinic acid, glutaric acid, adipic acid, pimelic acid, suberic acid, azelaic acid, sebacic acid, dodecanedicarboxylic acid, cyclohexanedicarboxylic acid, decalindicarboxylic acid, norbornanedicarboxylic acid, tricyclodecanedicarboxylic acid, pentacyclododecanedicarboxylic acid, isophoronedicarboxylic acid, 3,9-bis(2-carboxyethyl)-2,4,8,10-tetraoxaspiro[5.5]undecane, trimellitic acid, trimesic acid, pyromellitic acid, tricarballylic acid, terephthalic acid, isophthalic acid, phthalic acid, 2-methylterephthalic acid, naphthalenedicarboxylic acid, biphenyldicarboxylic acid, tetralindicarboxylic acid, and the like.

Exemplary methods for the polycondensation which may be employed in synthesizing the polyamide include a method in which polycondensation is allowed in a molten state, and a method in which polycondensation is once allowed in a molten state to obtain low viscosity polyamide, followed by subjecting to a heat treatment in a solid phase state (solid phase polymerization, generally referred to). Exemplary methods for the polycondensation in a molten state which may be employed include a method in which an aqueous solution of a nylon salt of a diamine and a dicarboxylic acid is heated under pressure, and then polycondensation is allowed in a molten state while eliminating water and condensed water, a method in which the diamine is directly added to the dicarboxylic acid in a molten state, and then polycondensation is allowed under normal pressure, and the like.

Examples of a specific polyamide that is a polycondensate of the compound or the like include aliphatic polyamides such as polycaprolactam (nylon 6), polylaurolactam (nylon 12), polyhexamethylenediadipamide (nylon 66), polyhexamethyleneazelamide (nylon 69), polyhexamethylenesebacamide (nylon 610), nylon 46, nylon 6/66, nylon 6/12, and a condensation product of 11-aminoundecanoic acid (nylon 11), aromatic polyamides such as polyhexamethyleneisophthalamide (nylon 6IP), m-xylenediamine/adipic acid copolymer (nylon MXD6), and m-xylenediamine/adipic acid/isophthalic acid copolymer, and the like. These may be used alone or as a mixture of two or more thereof.

Among these polyamides, nylon MXD6 having superior gas barrier properties is preferred. With respect to a diamine component of the nylon MXD6, m-xylylenediamine is preferably included in an amount of no less than 70 mol %. Whereas, with respect to a dicarboxylic acid component, adipic acid is preferably included in an amount of no less than 70 mol %. When nylon MXD6 is obtained from the monomer blended as described above, more superior gas barrier properties and mechanical performances can be achieved.

Polyester

The polyester is a polymer having an ester bond, and can be obtained by polycondensation of a polyvalent carboxylic acid with a polyol, and the like. Examples of the polyester which may be used as a resin having gas barrier properties of the inner liner include polyethylene terephthalate (PET), polyethylene naphthalate (PEN), polyglycolic acid (PGA), aromatic liquid crystal polyesters, and the like. These may be used alone or as a mixture of two or more thereof. Among these polyesters, PGA and wholly aromatic liquid crystal polyesters are preferred in light of the extent of gas barrier properties.

PGA

PGA is a homopolymer or copolymer having a structural unit represented by —O—$CH_2$—CO— (GA). The content of the aforementioned structural unit (GA) in PGA is preferably no less than 60% by mass, more preferably no less than 70% by mass, and still more preferably no less than 80% by mass. Also, the upper limit of the content is preferably 100% by mass. When the content of the structural unit (GA) is less than the lower limit described above, gas barrier properties may not be sufficiently achieved.

Exemplary methods for producing PGA may include (1) a method of synthesis by way of dehydrative polycondensation of glycolic acid, (2) a method of synthesis by way of dealcoholizing polycondensation of a glycolic acid alkyl ester, (3) a method of synthesis by way of ring-opening polymerization of glycolide (1,4-dioxane-2,5-dione), and the like.

Exemplary methods for synthesizing PGA as a copolymer may include methods in which copolymerization is carried out in each synthesis method described above using as a comonomer, for example, a cyclic monomer such as ethylene oxalate (1,4-dioxane-2,3-dione), lactide, lactones (for example, β-propiolactone, β-butyrolactone, pivalolactone, γ-butyrolactone, δ-valerolactone, β-methyl-δ-valerolactone, ε-caprolactone, etc.), trimethylene carbonate or 1,3-dioxane;

hydroxycarboxylic acid such as lactic acid, 3-hydroxypropanoic acid, 3-hydroxybutanoic acid, 4-hydroxybutanoic acid or 6-hydroxycaproic acid, or an alkyl ester thereof;

a mixture of aliphatic diol such as ethylene glycol or 1,4-butanediol with substantially equimolar aliphatic dicarboxylic acid such as succinic acid or adipic acid or an alkyl ester thereof; or the like, in appropriate combination with glycolide, glycolic acid or a glycolic acid alkyl ester.

In a specific method of the ring-opening polymerization described above in section (3), glycolide is heated to a temperature of about 120° C. to about 250° C. in the presence of a small amount of a catalyst (for example, a cationic catalyst such as organic tin carboxylates, tin halides or antimony halides). The ring-opening polymerization is carried out preferably by a bulk polymerization process or solution polymerization process.

In the ring-opening polymerization, glycolide used as a monomer may be obtained by a sublimation depolymerization process, a solution-phase depolymerization process, or the like of a glycolic acid oligomer.

A typical solution-phase depolymerization process includes, for example (1) heating a mixture containing a glycolic acid oligomer and at least one high-boiling point polar organic solvent having a boiling point within the range of 230 to 450° C., under an normal pressure or a reduced pressure at a temperature at which depolymerization of the oligomer occurs, (2) dissolving the oligomer in a solvent until a residual ratio (volume ratio) of the melt phase of the oligomer becomes no greater than 0.5, (3) allowing the oligomer to be depolymerized by further heating at the same temperature, (4) distilling off the produced dimer cyclic ester (glycolide) together with the high-boiling point polar organic solvent, and (5) recovering the glycolide from the distillate.

Examples of the high-boiling point polar organic solvent include phthalic acid bis(alkoxyalkyl ester) such as di(2-methoxyethyl)phthalate, alkylene glycol dibenzoate such as diethylene glycol dibenzoate, aromatic carboxylic acid esters such as benzylbutyl phthalate and dibutyl phthalate, aromatic phosphoric acid esters such as tricresyl phosphate, and the like. Also, together with the high-boiling point polar organic solvent, polypropylene glycol, polyethylene glycol, tetraethylene glycol or the like may be used in combination as a solubilizing agent of the oligomer if necessary.

Wholly Aromatic Liquid Crystal Polyester

The wholly aromatic liquid crystal polyester is a liquid crystalline polyester in which a polyvalent carboxylic acid and a polyol provided as monomers are both an aromatic compound. The wholly aromatic liquid crystal polyester may be obtained by polymerization according to a well-known method similar to general polyesters.

The aromatic polyvalent carboxylic acid is exemplified by terephthalic acid, isophthalic acid, 2,6-naphthalenedicarboxylic acid, 2,7-naphthalenedicarboxylic acid, 1,4-naphthalenedicarboxylic acid, 4,4'-biphenyldicarboxylic acid, 3,3'-biphenyldicarboxylic acid, 4,4'-methylene dibenzoic acid, diphenic acid and the like. These may be used alone or as a mixture of two or more thereof.

The aromatic polyol is exemplified by hydroquinone, methylhydroquinone, 4,4'-dihydroxydiphenyl, resorcinol, phenylhydroquinone, 3,4'-bisphenol A, and the like. These may be used alone or as a mixture of two or more thereof.

Moreover, the wholly aromatic liquid crystal polyester may be obtained also by polymerization of an aromatic compound that has a hydroxy group and a carboxyl group such as hydroxybenzoic acid or hydroxynaphthoic acid, etc., or copolymerization with the aromatic polyvalent carboxylic acid and an aromatic polyol.

EVOH

Hereinafter, EVOH suitably used as a resin having gas barrier properties of the inner liner of the present invention will be explained in detail.

EVOH contained in the resin composition of the layer A has an ethylene unit and a vinyl alcohol unit as principal structural units. It is to be noted that EVOH may include one type or a plurality of types of other structural unit in addition to the ethylene unit and the vinyl alcohol unit.

EVOH is usually obtained by polymerizing ethylene with a vinyl ester, and saponifying the resultant ethylene-vinyl ester copolymer.

The lower limit of the content of ethylene units in EVOH (i.e., the proportion of the number of ethylene units relative to the total number of monomer units in EVOH) is preferably 3 mol %, more preferably 10 mol %, still more preferably 20 mol %, and particularly preferably 25 mol %. On the other hand, the upper limit of the content of ethylene units in EVOH is preferably 70 mol %, more preferably 60 mol %, still more preferably 55 mol %, and particularly preferably 50 mol %. When the content of ethylene units in EVOH is less than the lower limit described above, water resistance, hot water resistance, and gas barrier properties under highly humid conditions of the inner liner may be deteriorated, or melt moldability of the inner liner may be impaired. To the contrary, when the content of ethylene units in EVOH is beyond the upper limit described above, the gas barrier properties of the inner liner may be deteriorated.

The lower limit of the saponification degree of EVOH (i.e., the proportion of the number of vinyl alcohol units relative to the total number of vinyl alcohol units and vinyl ester units in EVOH) is preferably 80 mol %, more preferably 95 mol %, and particularly preferably 99 mol %. On the other hand, the upper limit of the saponification degree of EVOH is preferably 99.99 mol %. When the saponification degree of EVOH is less than the lower limit described above, melt moldability may be impaired, and additionally the gas barrier properties of the inner liner may be deteriorated, or the coloring resistance and/or moisture resistance may be unsatisfactory. To the contrary, when the saponification degree of EVOH is beyond the upper limit described above, improvement of the gas barrier properties and the like with respect to an increase in production costs of EVOH can be expected to an unsatisfactory extent. Such EVOH may be used alone; however, an embodiment in which such EVOH is used as a blend with EVOH having a saponification degree exceeding 99 mol % is also suitable.

It is preferred that the content G (mol %) of the 1,2-glycol bond structural units in EVOH satisfies the following formula (I), and the intrinsic viscosity be no less than 0.05 L/g and no greater than 0.2 L/g. In the following formula (I), E represents the content of ethylene units (mol %) in EVOH (wherein, E≤64 (mol %)).

$$G \leq 1.58 - 0.0244 \times E \tag{1}$$

When the resin composition of the layer A contains EVOH having such a content G of the 1,2-glycol bond structural units and an intrinsic viscosity, a feature of decreasing humidity dependency of gas barrier properties of the resulting inner liner can be exhibited, and favorable transparency and gloss are provided, while lamination with other layer can be facilitated. Therefore, the applicability of the inner liner can be improved. It is to be noted that the content G of the 1,2-glycol bond structural units may be determined in accordance with the method described by S. Aniya et al., (Analytical Science Vol. 1, 91 (1985)), by way of a nuclear magnetic resonance process at a temperature of 90° C. with an EVOH sample prepared to give a dimethyl sulfoxide solution.

EVOH preferably has at least one selected from the group consisting of the structural units (I) and (II). The lower limit of the content of the structural units (I) or (II) with respect to all structural units is preferably 0.5 mol %, more preferably 1 mol %, and still more preferably 1.5 mol %. On the other hand, the upper limit of the content of the structural units (I) or (II) is preferably 30 mol %, more preferably 15 mol %, and still more preferably 10 mol %. When the resin composition of the layer A has the structural unit represented by the above formula (I) and/or (II) at a proportion falling within the above range, flexibility and processing characteristics of the resin composition constituting the layer A are improved, and consequently, the stretchability and melt moldability of the inner liner can be improved. Particularly, since flexibility of the resin composition constituting the layer A at low temperatures (e.g., −30° C.) is improved, durability of the inner liner in use at low temperature can be improved.

In the structural units (I) and (II), the aliphatic hydrocarbon group having 1 to 10 carbon atoms is exemplified by an alkyl group, an alkenyl group and the like, the alicyclic hydrocarbon group having 3 to 10 carbon atoms is exemplified by a cycloalkyl group, a cycloalkenyl group and the like, and the aromatic hydrocarbon group having 6 to 10 carbon atoms is exemplified by a phenyl group, and the like.

In the structural unit (I), it is preferred that $R^1$, $R^2$ and $R^3$ each independently represent a hydrogen atom, a methyl group, an ethyl group, a hydroxyl group, a hydroxymethyl group or a hydroxyethyl group. Among these, it is more preferred that they each independently represent a hydrogen atom, a methyl group, a hydroxyl group or a hydroxymethyl group. When $R^1$, $R^2$ and $R^3$ each represent these options, the stretchability and melt moldability of the inner liner can be further improved.

Although the method for allowing EVOH to include the structural unit (I) is not particularly limited, for example, a method in which a monomer derived into the structural unit (I) is copolymerized in the polymerization of ethylene and a vinyl ester may be involved. The monomer derived into the structural unit (I) is exemplified by an alkene such as propylene, butylene, pentene and hexene; and an alkene having a hydroxyl group and/or an ester group such as 3-hydroxy-1-propene, 3-acyloxy-1-propene, 3-acyloxy-1-butene, 4-acyloxy-1-butene, 3,4-diacyloxy-1-butene, 3-acyloxy-4-hydroxy-1-butene, 4-acyloxy-3-hydroxy-1-butene, 3-acyloxy-4-methyl-1-butene, 4-acyloxy-2-methyl-1-butene, 3-acyloxy-3-methyl-1-butene, 3,4-diacyloxy-2-methyl-1-butene, 4-hydroxy-1-pentene, 5-hydroxy-1-pentene, 4,5-dihydroxy-1-pentene, 4-acyloxy-1-pentene, 5-acyloxy-1-pentene, 4,5-diacyloxy-1-pentene, 4-hydroxy-3-methyl-1-pentene, 5-hydroxy-3-methyl-1-pentene, 4,5-dihydroxy-3-methyl-1-pentene, 5,6-dihydroxy-1-hexene, 4-hydroxy-1-hexene, 5-hydroxy-1-hexene, 6-hydroxy-1-hexene, 4-acyloxy-1-hexene, 5-acyloxy-1-hexene, 6-acyloxy-1-hexene and 5,6-diacyloxy-1-hexene. Of these, in light of reactivity for copolymerization, and gas barrier properties of the resulting inner liner, propylene, 3-acyloxy-1-propene, 3-acyloxy-1-butene, 4-acyloxy-1-butene, and 3,4-diacetoxy-1-butene are preferred. Specifically, among these, propylene, 3-acetoxy-1-propene, 3-acetoxy-1-butene, 4-acetoxy-1-butene, and 3,4-diacetoxy-1-butene are preferred, and of these, 3,4-diacetoxy-1-butene is particularly preferred. In the case of the alkene having an ester, derivation into the structural unit (I) is executed during the saponification reaction.

In the above structural unit (II), it is preferred that $R^4$ and $R^5$ both represent a hydrogen atom. Particularly, it is more preferred that $R^4$ and $R^5$ both represent a hydrogen atom, one of $R^6$ and $R^7$ represents an aliphatic hydrocarbon group having 1 to 10 carbon atoms, and the rest represents a hydrogen atom. The aliphatic hydrocarbon group is preferably an alkyl group or an alkenyl group. In light of particular note taken for the gas barrier properties of the inner liner, it is particularly preferred that one of $R^6$ and $R^7$ represents a methyl group or an ethyl group, and the rest represents a hydrogen atom. Alternatively, it is also particularly preferred that one of $R^6$ and $R^7$ represents a substituent represented by $(CH_2)_hOH$ (wherein, h is an integer of 1 to 8), and the rest represents a hydrogen atom. In the substituent represented by $(CH_2)_hOH$, h is preferably an integer of 1 to 4, more preferably 1 or 2, and particularly preferably 1.

Although the method for allowing EVOH to include the structural unit (II) is not particularly limited, for example, a method in which EVOH obtained by a saponification reaction is allowed to react with a monovalent epoxy compound to permit the EVOH to include the structural unit (II) may be employed. As the monovalent epoxy compound, a compound represented by any of the following formulae (III) to (IX) is suitably used.

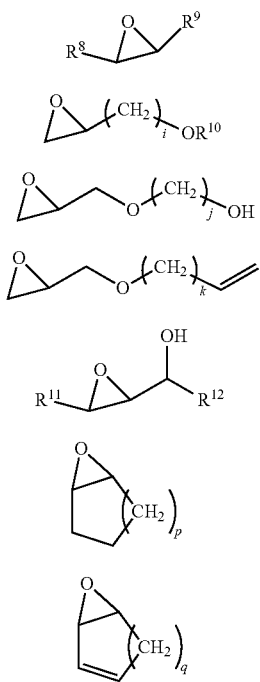

In the above formulae (III) to (IX), $R^8$, $R^9$, $R^{10}$, $R^{11}$ and $R^{12}$ each independently represent a hydrogen atom, an aliphatic hydrocarbon group having 1 to 10 carbon atoms such as an alkyl group or an alkenyl group, an alicyclic hydrocarbon group having 3 to 10 carbon atoms such as a cycloalkyl group or a cycloalkenyl group, or an aliphatic hydrocarbon group having 6 to 10 carbon atoms such as a phenyl group; and i, j, k, p and q each independently represent an integer of 1 to 8.

Examples of the monovalent epoxy compound represented by the above formula (III) include epoxyethane (ethylene oxide), epoxypropane, 1,2-epoxybutane, 2,3-epoxybutane, 3-methyl-1,2-epoxybutane, 1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 3-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-ethyl-1,2-epoxyheptane, 4-propyl-1,2-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 5-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 4,5-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-propane, 3-phenyl-1,2-epoxypropane, 1-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, and the like.

Examples of the monovalent epoxy compound represented by the above formula (IV) include methyl glycidyl ether, ethyl glycidyl ether, n-propyl glycidyl ether, isopropyl glycidyl ether, n-butyl glycidyl ether, isobutyl glycidyl ether, tert-butyl glycidyl ether, 1,2-epoxy-3-pentyloxypropane, 1,2-epoxy-3-hexyloxypropane, 1,2-epoxy-3-heptyloxypropane, 1,2-epoxy-4-phenoxybutane, 1,2-epoxy-4-benzyloxybutane, 1,2-epoxy-5-methoxypentane, 1,2-epoxy-5-ethoxypentane, 1,2-epoxy-5-propoxypentane, 1,2-epoxy-5-butoxypentane, 1,2-epoxy-5-pentyloxypentane, 1,2-epoxy-5-hexyloxypentane, 1,2-epoxy-5-phenoxypentane, 1,2-epoxy-6-methoxyhexane, 1,2-epoxy-6-ethoxyhexane, 1,2-epoxy-6-propoxyhexane, 1,2-epoxy-6-butoxyhexane, 1,2-epoxy-6-heptyloxyhexane, 1,2-epoxy-7-methoxyheptane, 1,2-epoxy-7-ethoxyheptane, 1,2-epoxy-7-propoxyheptane, 1,2-epoxy-7-butoxyheptane, 1,2-epoxy-8-methoxyoctane, 1,2-epoxy-8-ethoxyoctane, 1,2-epoxy-8-butoxyoctane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, and the like.

Examples of the monovalent epoxy compound represented by the above formula (V) include ethylene glycol monoglycidyl ether, propanediol monoglycidyl ether, butanediol monoglycidyl ether, pentanediol monoglycidyl ether, hexanediol monoglycidyl ether, heptanediol monoglycidyl ether, octanediol monoglycidyl ether, and the like.

Examples of the monovalent epoxy compound represented by the above formula (VI) include 3-(2,3-epoxy)propoxy-1-propene, 4-(2,3-epoxy)propoxy-1-butene, 5-(2,3-epoxy)propoxy-1-pentene, 6-(2,3-epoxy)propoxy-1-hexene, 7-(2,3-epoxy)propoxy-1-heptene, 8-(2,3-epoxy)propoxy-1-octene, and the like.

Examples of the monovalent epoxy compound represented by the above formula (VII) include 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-4-ethyl-1-hexanol, 3,4-epoxy-5-methyl-2-hexanol, 3,4-epoxy-5,5-dimethyl-2-hexanol, 3,4-epoxy-2-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-2-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-4-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, and the like.

Examples of the monovalent epoxy compound represented by the above formula (VIII) include 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycycloundecane, 1,2-epoxycyclododecane, and the like.

Examples of the monovalent epoxy compound represented by the above formula (IX) include 3,4-epoxycyclopentene, 3,4-epoxycyclohexene, 3,4-epoxycycloheptene, 3,4-epoxycyclooctene, 3,4-epoxycyclononene, 3,4-epoxycyclodecene, 1,2-epoxycycloundecene, 1,2-epoxycyclododecene, and the like.

Among the aforementioned monovalent epoxy compounds, epoxy compounds having 2 to 8 carbon atoms are preferred. Particularly, in light of easy handling of the compound, and reactivity with EVOH, the monovalent epoxy compound has carbon atoms of more preferably 2 to 6, and still more preferably 2 to 4. Also, among the monovalent epoxy compounds represented by the above formulae, compounds represented by the formula (III) or (IV) are particularly preferred. Specifically, in light of reactivity with EVOH and gas barrier properties of the resultant inner liner, 1,2-epoxybutane, 2,3-epoxybutane, epoxypropane, epoxyethane and glycidol are preferred, and of these, epoxypropane and glycidol are particularly preferred.

Next, a method for producing EVOH is explained in detail. A method for copolymerization of ethylene and a vinyl ester is not particularly limited, and for example any one of solution polymerization, suspension polymerization, emulsion polymerization and bulk polymerization may be employed. Further, either continuous, or batch-wise system may be adopted.

The vinyl ester which may be used for the polymerization is a fatty acid vinyl ester such as vinyl acetate, vinyl propionate, vinyl pivalate.

In the polymerization, further to the aforementioned components, a copolymerizable monomer, for example, other than those described in the foregoing, an alkene; an unsaturated acid such as acrylic acid, methacrylic acid, crotonic acid, maleic acid or itaconic acid, or an anhydride, salt, or mono or dialkyl ester thereof; a nitrile such as acrylonitrile or methacrylonitrile; an amide such as acrylamide or methacryl amide; an olefin sulfonic acid such as vinylsulfonic acid, allylsulfonic acid or methallylsulfonic acid, or a salt thereof; an alkyl vinyl ether, vinylketone, N-vinylpyrrolidone, vinyl chloride, vinylidene chloride and the like may be copolymerized as a copolymerization component in a small amount. In addition, as a copolymerization component, a vinylsilane compound may be contained in an amount of no less than 0.0002 mol % and no greater than 0.2 mol %. Examples of the vinylsilane compound include vinyltrimethoxysilane, vinyltriethoxysilane, vinyltri(β-methoxyethoxy)silane, γ-methacryloyloxypropylmethoxysilane, and the like. Of these, vinyltrimethoxysilane or vinyltriethoxysilane may be suitably used.

The solvent which may be used for the polymerization is not particularly limited as long as it is an organic solvent which can dissolve ethylene, vinyl ester and the ethylene-vinyl ester copolymer. As such a solvent, for example, an alcohol such as methanol, ethanol, propanol, n-butanol or tert-butanol; dimethyl sulfoxide, or the like may be used. Of these, methanol is particularly preferred in terms of ease in separation and removal after the reaction.

As the catalyst for use in the polymerization, for example, an azonitrile based initiator such as 2,2-azobisisobutyronitrile, 2,2-azobis-(2,4-dimethylvaleronitrile), 2,2-azobis-(4-methoxy-2,4-dimethylvaleronitrile) or 2,2-azobis-(2-cyclopropylpropionitrile); an organic peroxide based initiator such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide or t-butyl hydroperoxide, or the like may be used.

The polymerization temperature is 20 to 90° C., and preferably 40 to 70° C. The polymerization time is 2 to 15 hrs, and preferably 3 to 11 hrs. The degree of polymerization is 10 to 90%, and preferably 30 to 80% with respect to the vinyl ester charged. The resin content in the solution after the polymerization is 5 to 85%, and preferably 20 to 70%.

After the polymerization for a predetermined period of time or after reaching to a predetermined degree of polymerization, a polymerization inhibitor is added as needed, and unreacted ethylene gas is eliminated by evaporation, followed by removal of unreacted vinyl ester. In an exemplary method which may be employed for removing unreacted vinyl ester, for example, the copolymer solution is continuously supplied at a constant speed from above a tower packed with Raschig rings, while steam of an organic solvent such as methanol is blown into the bottom of the tower, a mixed steam of the organic solvent such as methanol and the unreacted vinyl ester is distilled off from the top of the tower, whereas the copolymer solution from which the unreacted vinyl ester was eliminated is recovered from the bottom of the tower.

Next, an alkali catalyst is added to the copolymer solution, and the copolymer is saponified. The saponification method may be executed by either a continuous or batchwise system. Examples of the alkali catalyst include sodium hydroxide, potassium hydroxide, alkali metal alcoholate, and the like.

Conditions of the saponification involve, for example in the case of a batchwise system, the copolymer solution concentration of 10 to 50%, the reaction temperature of 30 to 65° C., the catalyst amount used of 0.02 to 1.0 mol per mol of the vinyl ester structural unit, and the saponification time of 1 to 6 hrs.

Since EVOH after the saponification reaction contains the alkali catalyst, by-product salts such as sodium acetate and potassium acetate, and other impurities, these are preferably eliminated as needed by neutralization and washing. In this process, when EVOH after the saponification reaction is washed with water such as ion exchanged water, which is almost free from metal ions, chloride ions and the like, a part of sodium acetate, potassium acetate and the like may remain.

The resin composition constituting the layer A may contain one or a plurality of types of compounds selected from a phosphate compound, a carboxylic acid and a boron compound depending on the mode for carrying out the invention. When such a phosphate compound, a carboxylic acid or a boron compound is contained in the resin composition of the layer A, various types of performance of the inner liner can be improved.

Specifically, when a phosphate compound is contained in the resin composition of the layer A containing EVOH and the like, thermal stability of the inner liner during melt molding can be improved. The phosphate compound is not particularly limited, and is exemplified by various types of acids such as phosphoric acid and phosphorous acid, and salts thereof, and the like. The phosphoric acid salt may be included in any form such as, for example, a primary phosphate, a secondary phosphate or a tertiary phosphate, and its counter cation species is not particularly limited, which is preferably an alkali metal ion or an alkaline earth metal ion. Particularly, sodium dihydrogen phosphate, potassium dihydrogen phosphate, sodium hydrogen phosphate or potassium hydrogen phosphate is preferred in light of excellent effects of improving thermal stability.

The lower limit of the content of the phosphate compound (the content of the phosphate compound in terms of the phosphoric acid group equivalent in the dry resin composition of the layer A) is preferably 1 ppm, more preferably 10 ppm, and still more preferably 30 ppm. On the other hand, the upper limit of the content of the phosphate compound is preferably 10,000 ppm, more preferably 1,000 ppm, and still more preferably 300 ppm. When the content of the phosphate compound is less than the lower limit described above, coloring during melt molding tends to be significant. Since this tendency is remarkable when heat history is repeated in particular, a product obtained by forming a pellet of the resin composition may lack probability of recovery. To the contrary, when the content of the phosphate compound is beyond the upper limit described above, the product formed may easily generate gel and seeds.

In addition, the carboxylic acid included in the resin composition of the layer A containing EVOH and the like is effective in controlling the pH of the resin composition, and preventing gelation to improve the thermal stability. The carboxylic acid is preferably acetic acid or lactic acid in light of costs and the like.

The lower limit of the content of the carboxylic acid (the content of the carboxylic acid in the dry resin composition of the layer A) is preferably 1 ppm, more preferably 10 ppm, and still more preferably 50 ppm. On the other hand, the upper limit of the content of the carboxylic acid is preferably 10,000 ppm, more preferably 1,000 ppm, and still more preferably 500 ppm. When the content of the carboxylic acid is less than the lower limit described above, coloring may occur during the melt molding. To the contrary, the content of the carboxylic acid is beyond the upper limit described above, the interlayer adhesiveness may be insufficient.

Furthermore, the boron compound included in the resin composition of the layer A containing EVOH is effective in improving thermal stability. In detail, when the boron compound is added to the resin composition constituted with EVOH, it is believed that a chelate compound is produced between EVOH and the boron compound. Thus, use of such EVOH or the like enables more superior thermal stability to be achieved than common EVOH, and mechanical properties to be improved. The boron compound is not particularly limited, and examples include boric acids, boric acid esters, boric acid salts, boron hydrides, and the like. Specifically, the boric acids are exemplified by ortho-boric acid ($H_3BO_3$), meta-boric acid, tetraboric acid and the like; the boric acid esters are exemplified by triethyl borate, trimethyl borate and the like; the boric acid salts are exemplified by alkali metal salts, alkaline earth metal salts of the various types of the boric acids described above, borax and the like. Of these, ortho-boric acid is preferred.

The lower limit of the content of the boron compound (the content of the boron compound equivalent to boron in the dry resin composition of the layer A) is preferably 1 ppm, more preferably 10 ppm, and still more preferably 50 ppm. On the other hand, the upper limit of the content of the boron compound is preferably 2,000 ppm, more preferably 1,000 ppm, and still more preferably 500 ppm. When the content of the boron compound is less than the lower limit described above, the effect of improving thermal stability by adding the boron compound may not be achieved. To the contrary, when the content of the boron compound is beyond the upper limit described above, gelation is likely to occur, and forming defectiveness may be caused.

A process for including the phosphate compound, carboxylic acid or boron compound in the resin composition containing EVOH is not particularly limited, and for example, a process in which the phosphate compound is added to the resin composition when a pellet or the like of resin composition containing EVOH is prepared, followed by kneading may be suitably employed. A process for adding to the resin composition is not also particularly limited, and illustrative examples include a process of adding in a form of a dry powder, a process of adding in a paste form impregnated with a solvent, a process of adding in a suspended form into a liquid, a process of adding as a solution by dissolving in a solvent, and the like. Of these, in light of allowing for homogenously dispersion, a process of adding as a solution by dissolving in a solvent is preferred. The solvent used in these methods is not particularly limited, and water is suitably used in light of solubility of additives, advantages in terms of costs, ease in handling, safety in operational environments, and the like. When thus added, a metal salt, a resin other than EVOH and other additives and the like described later may be concomitantly added.

Moreover, as a process for including the phosphate compound, carboxylic acid, boron compound, a process of immersing a pellet or strand obtained with an extruder or the like after the aforementioned saponification in a solution containing these substance dissolved is also preferred in light of enabling homogenously dispersion. Also in this process, water is suitably used as a solvent for similar reasons to those described above. By dissolving a metal salt described later to this solution, the metal salt and the phosphate compound and the like may be contained together.

The resin composition of the layer A preferably contains a compound that has a conjugated double bond having a molecular weight of no greater than 1,000. Due to including such a compound, the hue of the resin composition of the layer A is improved; therefore, an inner liner having a favorable appearance can be produced. Examples of such a compound include conjugated diene compounds having a structure in which at least two carbon-carbon double bonds and one carbon-carbon single bond are alternately linked, triene compounds having a structure in which three carbon-carbon double bonds and two carbon-carbon single bonds are alternately linked, conjugated polyene compounds having a structure in which more carbon-carbon double bonds and carbon-carbon single bonds are alternately linked, conjugated triene compounds such as 2,4,6-octatriene, and the like. Furthermore, in the compound that has a conjugated double bond, a plurality of conjugated double bonds may be present independently in one molecule, and for example, a compound in which three conjugated trienes are included in the same molecule, such as wood oil, may be also involved.

Examples of the compound that has a conjugated double bond may have, for example, any of other various types of functional groups such as a carboxyl group and salts thereof, a hydroxyl group, an ester group, a carbonyl group, an ether group, an amino group, an imino group, an amide group, a cyano group, a diazo group, a nitro group, a sulfone group, a sulfoxide group, a sulfide group, a thiol group, a sulfonic acid group and salts thereof, a phosphoric acid group and salts thereof, a phenyl group, a halogen atom, a double bond, a triple bond, and the like. Such a functional group may be directly bound to a carbon atom in the conjugated double bond, or may be bound to a position away from the conjugated double bond. A multiple bond in the functional group may be present at a position capable of conjugating with the conjugated double bond, and for example, 1-phenylbutadiene having a phenyl group, and sorbic acid having a carboxyl group and the like are also included in the compound that has a conjugated double bond as referred to herein.

Specific examples of the compound include 2,4-diphenyl-4-methyl-1-pentene, 1,3-diphenyl-1-butene, 2,3-dimethyl-1,3-butadiene, 4-methyl-1,3-pentadiene, 1-phenyl-1,3-butadiene, sorbic acid, myrcene, and the like.

The conjugated double bond in the compound that has a conjugated double bond includes not only a conjugated double bond between aliphatic moieties such as a conjugated double bond in 2,3-dimethyl-1,3-butadiene or sorbic acid, but also a conjugated double bond between aliphatic and aromatic moieties such as a conjugated double bond in 2,4-diphenyl-4-methyl-1-pentene or 1,3-diphenyl-1-butene. Note that in light of possibility to obtain an inner liner having more superior appearance, the compound that includes a conjugated double bond between aliphatic moieties is preferred, and a compound that includes a conjugated double bond having a polar group such as a carboxyl group or a salt thereof, or a hydroxyl group is also preferred. Moreover, a compound that includes a conjugated double bond between aliphatic moieties and having a polar group is particularly preferred.

The molecular weight of the compound that has a conjugated double bond is preferably no greater than 1,000. When the molecular weight is greater than 1,000, surface smoothness, extrusion stability and the like of the inner liner may be deteriorated. The lower limit of the content of the compound that has a conjugated double bond having a molecular weight of no greater than 1,000 is, in light of achievable effects, preferably 0.1 ppm, more preferably 1 ppm, still more preferably 3 ppm, and particularly preferably 5 ppm. On the other hand, the upper limit of the content of the compound is, in light of achievable effects, preferably 3,000 ppm, more preferably 2,000 ppm, still more preferably 1,500 ppm, and particularly preferably 1,000 ppm.

A preferable process of adding the compound that has a conjugated double bond may include, in the case of EVOH for example, polymerizing as described above, followed by adding the compound prior to the saponification described above, in light of the improvement of the surface smoothness and extrusion stability. Although the reason is not necessarily clarified, the compound that has a conjugated double bond is believed to serve in preventing EVOH, etc., from deterioration before the saponification and/or during the saponification reaction.

The resin composition of the layer A may contain in addition to the aforementioned additives, a resin other than the resin having gas barrier properties, or various additives such as a heat stabilizer, an ultraviolet ray absorbing agent, an antioxidant, a colorant and a filler in the range not to impair the object of the present invention. When the resin composition of the layer A contains such additives other than the additives described above, the amount is preferably no greater than 50% by mass, more preferably no greater than 30% by mass, and particularly preferably no greater than 10% by mass with respect to the total amount of the resin composition.

Layer B

The layer B is constituted with a resin composition containing an elastomer. Since the layer B constituted with a resin composition containing an elastomer is laminated, the inner liner can have improved stretchability and thermoformability. In addition, since the inner liner can enhance the interlayer adhesiveness between the layer B and the layer A, high durability can be provided, and gas barrier properties and stretchability can be maintained even if used with deformation.

Elastomers are resins having elasticity at around normal temperatures, and more specifically, resins having the following feature: when a sample is stretched two-fold under a room temperature condition (20° C.) and maintained as is for 1 min, the sample contracts to a length of less than 1.5-fold of the initial length within 1 min. In addition, elastomers are generally, in terms of their structures, polymers having a hard segment and a soft segment in the polymer chain.

As the elastomer, at least one selected from the group consisting of a polystyrene based elastomer, a polyolefin based elastomer, a polydiene based elastomer, a polyvinyl chloride based elastomer, a chlorinated polyethylene based elastomer, a polyurethane based elastomer, a polyester based elastomer, a polyamide based elastomer and a fluorine-contained resin based elastomer may be exemplified. Of these, in light of ease of forming, at least one selected from the group consisting of a polystyrene based elastomer, a polyolefin based elastomer, a polydiene based elastomer, a polyurethane based elastomer, a polyester based elastomer and a polyamide based elastomer are preferably used, and a polyurethane based elastomer is more preferably used.

Alternatively, such an elastomer may be selected ad libitum for use from among well-known thermoplastic elastomers, and nonthermoplastic elastomers; however, for use in melt forming, a thermoplastic elastomer is preferably used.

As the thermoplastic elastomer, at least one selected from the group consisting of a polystyrene based thermoplastic elastomer, a polyolefin based thermoplastic elastomer, a polydiene based thermoplastic elastomer, a polyvinyl chloride based thermoplastic elastomer, a chlorinated polyethylene based thermoplastic elastomer, a polyurethane based thermoplastic elastomer, a polyester based thermoplastic elastomer, a polyamide based thermoplastic elastomer and a fluorine-contained resin based thermoplastic elastomer may be exemplified. Of these, in light of ease of molding, at least one selected from the group consisting of a polystyrene based thermoplastic elastomer, a polyolefin based thermoplastic elastomer, a polydiene based thermoplastic elastomer, a polyurethane based thermoplastic elastomer, a polyester based thermoplastic elastomer and a polyamide based thermoplastic elastomer is preferably used, and a polyurethane based thermoplastic elastomer is more preferably used.

Polystyrene Based Thermoplastic Elastomer

The polystyrene based thermoplastic elastomer has an aromatic vinyl based polymer block (hard segment) and a rubber block (soft segment). Thus, the aromatic vinyl based polymer moiety serves as a bridging point through forming physical crosslinking, whereas the rubber block imparts rubber elasticity.

The polystyrene based thermoplastic elastomer is exemplified by, according to the arrangement pattern of the soft segment included therein, styrene-butadiene-styrene block copolymers (SBS); styrene-isoprene-styrene block copolymers (SIS); styrene-isobutylene-styrene block copolymers (SIBS); styrene-ethylene/butylene-styrene block copolymers (SEBS); styrene-ethylene/propylene-styrene block copolymers (SEPS); block copolymers of crystalline polyethylene and an ethylene/butylene-styrene random copolymer obtained by hydrogenating a block copolymer of polybutadiene with a butadiene-styrene random copolymer; diblock copolymers obtained by hydrogenating a block copolymer of polybutadiene or an ethylene-butadiene random copolymer with polystyrene, such as e.g., a diblock copolymer of crystalline polyethylene and polystyrene. It is to be noted that these polystyrene based thermoplastic elastomers may be modified product such as modified products with maleic anhydride, or the like.

Among these, in view of the harmony of mechanical strength, heat resistance stability, weather resistance, chemical resistance, gas barrier properties, flexibility, processability and the like, styrene-isobutylene-styrene block copolymers (SIBS), styrene-ethylene/butylene-styrene block copolymers (SEBS) and styrene-ethylene/propylene-styrene block copolymers (SEPS) are preferred.

Polyolefin Based Thermoplastic Elastomer

The polyolefin based thermoplastic elastomer is exemplified by thermoplastic elastomers produced using a polyolefin such as polypropylene or polyethylene as a hard segment, and an ethylene-propylene-diene copolymerized rubber or the like as a soft segment. There are polyolefin based thermoplastic elastomers of blend type and implant type. In addition, a maleic anhydride-modified ethylene-butene-1 copolymer, a maleic anhydride-modified ethylene-propylene copolymer, a halogenated butyl based rubber, modified polypropylene, modified polyethylene and the like may be also exemplified.

Polydiene Based Thermoplastic Elastomer

The polydiene based thermoplastic elastomer is exemplified by 1,2-polybutadiene based TPE and trans 1,4-polyisoprene based TPE, hydrogenated conjugated diene based TPE, epoxidized natural rubber, modified products with maleic anhydride of these, and the like.

The 1,2-Polybutadiene based TPE is polybutadiene containing no less than 90% 1,2-bond in the molecule, and composed of crystalline syndiotactic 1,2-polybutadiene as a hard segment, and amorphous 1,2-polybutadiene as a soft segment.

On the other hand, the trans 1,4-polyisoprene based TPE has no less than 98% trans 1,4-structure, and composed of a crystalline trans 1,4-segment as a hard segment, and a noncrystalline trans 1,4-segment as a soft segment.

Polyvinyl Chloride (PVC) Based Thermoplastic Elastomer

There are, in general, three types of polyvinyl chloride based thermoplastic elastomers (TPVC) as follows. It is to be noted that the TPVC which may be used includes modified products such as maleic anhydride-modified PVC.

(1) Blend Type TPVC of High-Molecular-Weight PVC/Plasticized PVC

In this type of TPVC, high-molecular-weight PVC is used as a hard segment to allow the microcrystalline parts to serve as a crosslinking point, and PVC plasticized with a plasticizer is used as a soft segment.

(2) Blend Type TPVC of Partially Crosslinked PVC/Plasticized PVC

In this type of TPVC, PVC having a partially crosslinked or branched structure introduced thereto is used as a hard segment, and as a soft segment PVC plasticized with a plasticizer is used.

(3) Alloy Type TPVC of PVC/Elastomer

In this type of TPVC, PVC is used as a hard segment, and as a soft segment a rubber or TPE such as partially crosslinked NBR, polyurethane based TPE or polyester based TPE is used.

Chlorinated Polyethylene (CPE) Based Thermoplastic Elastomer

The chlorinated polyethylene based thermoplastic elastomer is a soft resin obtained by allowing polyethylene in the form of an aqueous suspension liquid, or in a solvent such as carbon tetrachloride to react with a chlorine gas. In CPE, a crystalline polyethylene moiety is used as a hard segment, and a chlorinated polyethylene moiety is used as a soft segment. In CPE, both moieties are present admixed to form a multi block or random structure.

CPE can have varying molecular characteristics such as the chlorine content, block feature and degree of residual crystallization depending on the type, degree of chlorination, conditions of production and the like of the material polyethylene, and consequently a variety of properties can be attained with a wide range of hardness including those of resins and rubbers. In addition, crosslinking of CPE enables to provide properties similar to those of vulcanized rubbers, and modified products may be also produced by modification with maleic anhydride.

Polyester Based Thermoplastic Elastomer

The polyester based thermoplastic elastomer (TPEE) is a multi block copolymer in which polyester is used as a hard segment, and a polyether or polyester having a low glass transition temperature (Tg) is used as a soft segment in the molecule. There are following types of TPEE depending on their molecular structures; however, (1) polyester-polyether type and (2) polyester-polyester type may be generally employed among these.

(1) Polyester-Polyether Type TPEE

In this type of TPEE, an aromatic crystalline polyester is used as a hard segment, and as a soft segment a polyether is used, in general.

(2) Polyester-Polyester Type TPEE

In this type of TPEE, an aromatic crystalline polyester is used as a hard segment, and as a soft segment an aliphatic polyester is used.

(3) Liquid Crystalline TPEE

In this type of TPEE, as a special hard segment, a rigid liquid crystal molecule is used, and as a soft segment an aliphatic polyester is used.

Polyamide Based Thermoplastic Elastomer

The polyamide based thermoplastic elastomer (TPA) is a multi block copolymer in which polyamide is used as a hard segment, and as a soft segment a polyether or polyester having low Tg is used. The component of polyamide is selected from nylons 6, 66, 610, 11, 12, etc., and nylon 6 or nylon 12 may be generally employed.

As a substance for constituting the soft segment, a long chain polyol such as polyetherdiol or polyesterdiol may be used. Typical examples of the polyether include poly(oxytetramethylene)glycol (PTMG), poly(oxypropylene)glycol, and the like. Typical examples of the polyesterdiol include poly(ethylene adipate) glycol, poly(butylene-1,4-adipate) glycol, and the like.

Fluorine-Contained Resin Based Thermoplastic Elastomer

The fluorine-contained resin based thermoplastic elastomer is an ABA type block copolymer composed of a fluorine-contained resin as a hard segment, and as a soft segment a fluorine rubber. The fluorine-contained resin of the hard segment which may be used is a tetrafluoroethylene-ethylene copolymerized polymer or polyvinylidene fluoride (PVDF), whereas the fluorine rubber of the soft segment which may be used is a vinylidene fluoride-hexafluoropropylene-tetrafluoroethylene ternary copolymerized polymer, or the like. More specifically, those including a vinylidene fluoride based rubber, an ethylene tetrafluoride-propylene rubber, an ethylene tetrafluoride-perfluoromethyl vinyl ether rubber, a phosphazene based fluorine rubber, a fluoropolyether, a fluoronitroso rubber or perfluorotriazine may be exemplified.

In the fluorine-contained resin based TPE, crosslinking points are formed by the hard segment through microphase separation, similarly to other TPE.

Polyurethane Based Thermoplastic Elastomer

Polyurethane based thermoplastic elastomer (TPU) is a linear multi block copolymer, etc., including (1) as a hard segment a polyurethane obtained by a reaction of a short chain glycol (low molecular weight polyol) with an isocyanate, and (2) as a soft segment a polyurethane obtained by a reaction of a long chain glycol (high molecular weight polyol) with an isocyanate. In this regard, polyurethane is a generic name of compounds having an urethane bond (—NHCOO—), obtained by a polyaddition reaction (urethanating reaction) of isocyanate (—NCO) with an alcohol (—OH).

In the inner liner of the present invention, lamination of the layer B constituted with a resin composition containing TPU as an elastomer is preferred since stretchability and thermoformability can be improved. In addition, this inner liner enables the interlayer adhesiveness between the layer B and the layer A described above to be strengthened, and is thus preferred since superior durability can be attained, and gas barrier properties and stretchability can be maintained even if used with deformation.

TPU is constituted with a high molecular weight polyol, an organic polyisocyanate, a chain extender and the like. This high molecular weight polyol is a substance having a plurality of hydroxyl groups, and may be obtained by polycondensation, addition polymerization (for example, ring-opening polymerization), polyaddition, or the like. Examples of the high molecular weight polyol include a polyester polyol, a polyether polyol, a polycarbonate polyol, a cocondensate thereof (for example, a polyester-ether-polyol), and the like. These high molecular weight polyol may be used either alone of one type, or as a mixture of two types thereof. Of these, a polyester polyol or a polycarbonate polyol is preferred, and a polyester polyol is particularly preferred.

The polyester polyol may be produced, for example, according to a conventional method, by allowing an ester formable derivative such as a dicarboxylic acid, an ester thereof or an anhydride thereof to be condensed with a low molecular weight polyol by way of a direct esterification reaction or a transesterification reaction, or by subjecting a lactone to ring-opening polymerization.

The dicarboxylic acid that constitutes the dicarboxylic acid polyester polyol is not particularly limited, and a dicarboxylic acid generally employed in producing a polyester may be used. Specific examples of the dicarboxylic acid include aliphatic dicarboxylic acids having 4 to 12 carbon atoms such as succinic acid, glutaric acid, adipic acid, pimelic acid, suberic acid, azelaic acid, sebacic acid, dodecanedioic acid, methylsuccinic acid, 2-methylglutaric acid, trimethyladipic acid, 2-methyloctanedioic acid, 3,8-dimethyldecanedioic acid and 3,7-dimethyldecanedioic acid; alicyclic dicarboxylic acids such as cyclohexanedicarboxylic acid; aromatic dicarboxylic acids such as terephthalic acid, isophthalic acid, orthophthalic acid and naphthalenedicarboxylic acid, and the like. These dicarboxylic acids may be used either alone of one type, or as a mixture of two types thereof. Of these, due to having a carbonyl group that can be more readily reacted with a hydroxyl group of EVOH and the like in the layer A, and further enhancing the interlayer adhesiveness of the inner liner, aliphatic dicarboxylic acids having 6 to 12 carbon atoms are preferred, and adipic acid, azelaic acid or sebacic acid is particularly preferred.

The low molecular weight polyol is not particularly limited, and generally employed low molecular weight polyols may be used. Specific examples of the low molecular weight polyol include aliphatic diols having 2 to 15 carbon atoms such as ethylene glycol, diethylene glycol, triethylene glycol, propylene glycol, 1,3-propanediol, 2-methyl-1,3-propanediol, 1,3-butylene glycol, 1,4-butanediol, neopentyl glycol, 1,5-pentanediol, 3-methyl-1,5-pentanediol, 1,6-hexanediol, 1,8-octanediol, 2-methyl-1,8-octanediol, 2,7-dimethyl-1,8-octanediol, 1,9-nonanediol, 2-methyl-1,9-nonanediol, 1,10-decanediol and 2,2-diethyl-1,3-propanediol; alicyclic diols such as 1,4-cyclohexanediol, cyclohexanedimethanol, cyclooctanedimethanol and dimethylcyclooctanedimethanol; aromatic bivalent alcohols such as 1,4-bishydroxyethoxy)benzene, and the like. These low molecular weight polyols may be used either alone of one type, or as a mixture of two types thereof. Among these, aliphatic diols having 5 to 12 carbon atoms and having a methyl group on the side chain such as 3-methyl-1,5-pentanediol, 2-methyl-1,8-octanediol, 2,7-dimethyl-1,8-octanediol, 1,9-nonanediol and 2,8-dimethyl-1,9-nonanediol are preferred in terms of ease of occurrence of the reaction of the ester group in the polyester polyol with a hydroxyl group of EVOH and the like in the layer A, and the like, and possibility of providing more superior interlayer adhesiveness of the multilayered structure obtained. In addition, when two or more types of the low molecular weight polyols are used as a mixture, it is more preferred that such an aliphatic diol having 5 to 12 carbon atoms and having a methyl group on the side chain is used in a proportion of no less than 50 mol % with respect to the total amount of the low molecular weight polyol. Furthermore, together with the low molecular weight polyol, a small amount of low molecular weight polyol having three or more functionalities may be used in combination. Examples of the low molecular weight polyol having three or more functionalities include trimethylolpropane, trimethylolethane, glycerin, 1,2,6-hexanetriol, and the like.

Examples of the lactone include ε-caprolactone, β-methyl-δ-valerolactone, and the like.

Examples of the polyether polyol include polyethylene glycol, polypropylene glycol, polytetramethylene glycol, poly(methyltetramethylene) glycol, and the like. These polyether polyols may be used either alone of one type, or as a mixture of two types thereof. Among these, polytetramethylene glycol is preferred.

As the polycarbonate polyol, for example, a product obtained by condensation polymerization of an aliphatic diol having 2 to 12 carbon atoms such as 1,4-butanediol, 1,5-pentanediol, 1,6-hexanediol, 1,8-octanediol or 1,10-decanediol, or a mixture of these with diphenyl carbonate, phosgene or the like may be suitably used.

The lower limit of the number average molecular weight of the high molecular weight polyol is preferably 500, more preferably 600, and still more preferably 700. On the other hand, the upper limit of the number average molecular weight of the high molecular weight polyol is preferably 8,000, more preferably 5,000, and still more preferably 3,000. When the number average molecular weight of the high molecular weight polyol is less than the lower limit described above, miscibility with the organic polyisocyanate is so high that the resulting TPU has inferior resilience, whereby mechanical characteristics such as stretchability and thermoformability of the multilayered structure obtained may be deteriorated. To the contrary, when the number average molecular weight of the high molecular weight polyol is beyond the upper limit described above, miscibility with the organic polyisocyanate is so low that mixing in the polymerization procedure may be difficult, and as a result, stable production of TPU may fail resulting from generation of blocks of gelatinous matter, and the like. It is to be noted that the number average molecular weight of the high molecular weight polyol is determined in accordance with JIS-K-1577, which is a number average molecular weight calculated on the basis of the hydroxyl value.

The organic polyisocyanate is not particularly limited, and well-known organic diisocyanate generally employed in producing TPU may be used. Examples of the organic diisocyanate include aromatic diisocyanate such as 4,4'-diphenylmethanediisocyanate, tolylenediisocyanate, phenylenediisocyanate, xylylenediisocyanate, 1,5-naphthylene diisocyanate, 3,3'-dichloro-4,4'-diphenylmethanediisocyanate and toluoylenediisocyanate; aliphatic or alicyclic diisocyanate such as hexamethylenediisocyanate, isophoronediisocyanate, 4,4'-dicyclohexylmethanediisocyanate and hydrogenated xylylenediisocyanate, and the like. Among these, in light of possibility of improving the strength and flex resistance of the multilayered structure obtained, 4,4'-diphenylmethanediisocyanate is preferred. These organic diisocyanate may be used either one type alone, or in combination of two or more types thereof.

As the chain extender, any chain extender generally employed for producing TPU may be used, and a low molecular weight compound having two or more active hydrogen atoms that can react with an isocyanate group in the molecule and having a molecular weight of no greater than 300 is suitably used. Examples of the chain extender include diols such as ethylene glycol, propylene glycol, 1,4-butanediol, 1,6-hexanediol, 1,4-bis(β-hydroxyethoxy) benzene and 1,4-cyclohexanediol, and the like. Among these, in light of stretchability and thermoformability of the multilayered structure obtained being more favorable, an aliphatic diol having 2 to 10 carbon atoms is preferred, and 1,4-butanediol is particularly preferred. These chain extenders may be used either alone of one type, or as a mixture of two types thereof.

In a method for producing TPU, the aforementioned high molecular weight polyol, the organic polyisocyanate and the chain extender are used for producing TPU utilizing a well-known urethanating reaction technique, and any of a prepolymer method and a one-shot method may be used for the production. Of these, melt polymerization carried out under a condition substantially free from a solvent is preferred, and continuous melt polymerization carried out using a multiscrew extruder is particularly preferred.

In TPU, it is preferred that a ratio (isocyanate/(high molecular weight polyol+chain extender)) of the mass of the organic polyisocyanate to the total mass of the high molecular weight polyol and the chain extender is no greater than 1.02. When the ratio is beyond 1.02, stability in long-term operation during molding may be deteriorated.

Although the nitrogen content of TPU may be predetermined by appropriately selecting the ratio of the high molecular weight polyol and the organic diisocyanate employed, the content practically falls within the range of 1 to 7% by mass.

In addition, for the resin composition of the layer B, an adequate catalyst or the like may be used if necessary, which accelerates the reaction of the organic polyisocyanate and the high molecular weight polyol, for example. Moreover, the resin composition of the layer B may contain a variety of additives such as a resin other than the elastomer, a heat stabilizer, an ultraviolet ray absorbing agent, an antioxidant, a colorant and a filler, in the range not to impair the object of the present invention. When the resin composition of the layer B contains an additive, the amount thereof is preferably no greater than 50% by mass, more preferably no greater than 30% by mass, and is preferably no greater than 10% by mass with respect to the total amount of the resin composition.

The hardness of the elastomer such as TPU in the resin composition of the layer B is, in terms of Shore A hardness, preferably 50 to 95, more preferably 55 to 90, and still more preferably 60 to 85. Use of TPU having a hardness falling within the above range is preferred, since a laminated structure that is superior in mechanical strength and durability, and has excellent flexibility is obtained.

Metal Salt

In the inner liner, at least one of the resin compositions included in the layer A and the layer B that are adjacent with each other preferably contains a metal salt. By thus including a metal salt in at least one of the layer A and the layer B that are adjacent with each other, very superior interlayer adhesiveness between the layer A and the layer B can be achieved. Owing to such very superior interlayer adhesiveness, the inner liner has superior durability. Although the reason for improvement of the interlayer adhesiveness of the metal salt is not necessarily clear, it is believed that the improvement would result from acceleration of a bond forming reaction that occurs between the resin having gas barrier properties in the resin composition of the layer A, and the elastomer in the resin composition of the layer B owing to the presence of the metal salt, and the like. As such a bond forming reaction, a hydroxyl group exchange reaction that occurs between a carbamate group of TPU, an amino group of polyamide or the like and a hydroxyl group, etc., of the resin having gas barrier properties, an addition reaction of a hydroxyl group, etc., of the resin having gas barrier properties to a remaining isocyanate group in TPU, an amide-producing reaction between an end carboxyl group of polyamide and a hydroxyl group of EVOH, as well as a binding reaction that is involved between the resin having gas barrier properties and an adhesive resin, and the like may be assumed. It should be noted that the metal salt may be included in both the resin composition of the layer A and the resin composition of the layer B, or either one of the resin composition of the layer A or the resin composition of the layer B.

Although the metal salt is not particularly limited, an alkali metal salt, an alkaline earth metal salt or a metal salt of a d-block metal listed in the fourth row of periodic table is preferred since the interlayer adhesiveness can be further enhanced. Among these, an alkali metal salt or an alkaline earth metal salt is more preferred, and an alkali metal salt is particularly preferred.

The alkali metal salt is not particularly limited, and examples thereof include aliphatic carboxylic acid salts, aromatic carboxylic acid salts, phosphoric acid salts, and metal complexes of lithium, sodium, potassium, etc., and the like. Specific examples of the alkali metal salt include sodium acetate, potassium acetate, sodium phosphate, lithium phosphate, sodium stearate, potassium stearate, a sodium salt of ethylenediamine tetra acetic acid, and the like. Among these, sodium acetate, potassium acetate and sodium phosphate are particularly preferred, in light of being easily available.

The alkaline earth metal salt is not particularly limited, and examples thereof include acetic acid salts or phosphoric acid salts of magnesium, calcium, barium, beryllium, or the like. Among these, acetic acid salts or phosphoric acid salts of magnesium or calcium are particularly preferred, in light of being easily available. To include such an alkaline earth metal salt is also advantageous in capability of reducing the amount of adhesion to a die of a molding machine of the resin yielded by heat deterioration during melt molding.

Although the metal salt of a d-block metal listed in the fourth row of periodic table is not particularly limited, examples thereof include carboxylic acid salts, phosphoric acid salts or acetylacetonate salts of titanium, vanadium, chromium, manganese, iron, cobalt, nickel, copper, zinc, etc., and the like.

The lower limit of the content of the metal salt (content in terms of metal element equivalent on the basis of the entire inner liner) is preferably 1 ppm, more preferably 5 ppm, still more preferably 10 ppm, and particularly preferably 20 ppm. On the other hand, the upper limit of the content of the metal salt is preferably 10,000 ppm, more preferably 5,000 ppm, still more preferably 1,000 ppm, and particularly preferably 500 ppm. When the content of the metal salt is less than the lower limit described above, the interlayer adhesiveness may be inferior, and thus the durability of the inner liner may be deteriorated. To the contrary, when the content of the metal salt is beyond the upper limit described above, coloring of the resin composition may be significant, whereby the appearance of the inner liner may be deteriorated.

The lower limit of the content of the metal salt with respect to each resin composition containing the metal salt is preferably 5 ppm, more preferably 10 ppm, still more preferably 20 ppm, and particularly preferably 50 ppm. On the other hand, the upper limit of the content of the metal salt is preferably 5,000 ppm, more preferably 1,000 ppm, still more preferably 500 ppm, and particularly preferably 300 ppm. When the content of the metal salt is less than the lower limit described above, adhesiveness to other adjacent layer may be inferior, and thus the durability of the inner liner may be deteriorated. To the contrary, when the content of the metal salt is beyond the upper limit described above, coloring of the resin composition may be significant, whereby the appearance of the inner liner may be deteriorated.

The metal salt may be included in the resin composition of the layer A or the layer B by any method, which is not particularly limited, and a method similar to one for including a phosphate compound or the like in the resin composition of the layer A as described above may be employed.

Oxygen Scavenger

The resin compositions that constitute the layer A and the layer B may contain in addition to the aforementioned metal salt and the like any of various components. As such a component, for example, an oxygen scavenger may be included. The oxygen scavenger may be particularly suitably used when the resin composition that constitutes the layer B includes an adhesive resin. The oxygen scavenger may be contained in either one of the resin compositions that constitute the layer A or the layer B, it is preferably contained in the resin composition of the layer A.

The oxygen scavenger is a substance having an oxygen scavenging ability (oxygen absorbing function). The oxygen scavenging ability as referred to means a function of absorbing and consuming oxygen from a given environment, or decreasing the amount of oxygen. The oxygen scavenger which may be contained in the resin composition is not particularly limited as long as it has such properties. By containing the oxygen scavenger in the resin composition, the gas barrier properties of the inner liner can be further improved as a result of addition of oxygen scavenging ability. As the oxygen scavenger, various types of substances may be used, examples thereof include organic oxygen scavengers such as a thermoplastic resin having an oxygen scavenging ability or ascorbic acid; inorganic oxygen scavengers such as iron or a sulfurous acid salt, and the like. Of these, a thermoplastic resin having an oxygen scavenging ability is preferred since superior oxygen scavenging property is provided, and it can be easily contained in the resin composition of the inner liner.

Thermoplastic Resin Having Oxygen Scavenging Ability

The thermoplastic resin having an oxygen scavenging ability is not particularly limited as long as it is a thermoplastic resin capable of scavenging oxygen, and examples include ethylene based unsaturated hydrocarbon polymers having a carbon-carbon double bond, or polymer blends (other than those having a molecular weight of no greater than 1,000 and having a conjugated double bond), hereinafter, may be also referred to as merely "unsaturated hydrocarbon polymer", and the like.

Unsaturated Hydrocarbon Polymer

The unsaturated hydrocarbon polymer may have a substituent, or may be unsubstituted. The unsubstituted unsaturated hydrocarbon polymer is defined as an arbitrary compound having at least one aliphatic carbon-carbon double bond and consisting of 100% by mass carbon and hydrogen in total. Also, the substituted unsaturated hydrocarbon polymer is defined as an ethylene based unsaturated hydrocarbon having at least one aliphatic carbon-carbon double bond and including about 50 to 99% by mass carbon and hydrogen in total. Preferable unsubstituted or substituted unsaturated hydrocarbon polymer has at least two ethylene based unsaturated groups per molecule. More preferably, the unsubstituted or substituted unsaturated hydrocarbon polymer is a polymer compound having at least two ethylene based unsaturated groups, and a mass average molecular weight of equal to or greater than 1,000. The polymer blend of the ethylene based unsaturated hydrocarbon may be composed of a mixture of 2 types or more types of substituted or unsubstituted ethylene based unsaturated hydrocarbons.

Examples of preferable unsubstituted unsaturated hydrocarbon polymers include the followings diene polymers such as e.g., polyisoprene, (for example, trans-polyisoprene), polybutadiene (particularly preferably 1,2-polybutadiene), and copolymers of the same such as e.g., styrene-butadiene, but not limited thereto. Such hydrocarbons also include: polymer compounds, e.g., polypentenamers, polyoctenamers, and other polymers produced by double decomposition of an olefin; diene oligomers such as e.g., squalene; and polymers or copolymers derived from dicyclopentadiene, norbornadiene, 5-ethylidene-2-norbornene, or other monomer that includes at least two carbon-carbon double bonds (conjugated or unconjugated). These hydrocarbons further involve carotenoids, for example, β-carotene.

Preferable substituted unsaturated hydrocarbon polymers may include those having an oxygen-containing moiety, such as e.g., esters, carboxylic acids, aldehydes, ethers, ketones, alcohols, peroxides, and/or hydroperoxides, but not limited thereto. Specific examples of such hydrocarbons include condensed polymers such as e.g., polyesters derived from a monomer that includes a carbon-carbon double bond; unsaturated fatty acids such as e.g., oleic acid, ricinoleic acid, dehydrated ricinoleic acid and linoleic acid, and derivatives thereof such as e.g., esters, but not limited thereto. The hydrocarbons may involve (meth)allyl (meth) acrylate.

In the unsaturated hydrocarbon polymer, the content of the carbon-carbon double bond is preferably 0.01 to 1.0 equivalent with respect to 100 g of the polymer. When the content of the double bonds in the polymer is limited to fall within such a range, both the oxygen scavenging property and physical properties of the inner liner can be maintained to be superior.

The polymer including thus decreased double bonds can be a homopolymer, a copolymer, and/or a polymer blend. The polymer blend is particularly desired since a change of physical properties in a discontinuous phase has comparatively small influences on the physical properties of the entire blend which would predominantly have a continuous phase, and thus it is desired that a majority of existing double bonds are included in the discontinuous phase.

Suitable examples of the homopolymer include poly(octenamer) having 0.91 equivalent of double bonds in 100 g of the polymer, and poly(4-vinylcyclohexene) having 0.93 equivalent of double bonds in 100 g of the polymer. Examples of suitable copolymers include alkyl acrylates and alkyl methacrylates having 1 to 4 carbon atoms. Other examples include copolymers derived from 1,3-butadiene, isoprene, 5-ethylidene-2-norbornene, 4-vinylcyclohexene, 1,4-hexadiene, 1,6-octadiene or the like with one, or two or more types of vinyl monomers such as e.g., ethylene, propylene, styrene, vinyl acetate, and/or α-olefin. Specific examples include terpolymers of ethylene, propylene and 5-ethylidene-2-norbornene. Such EPDM elastomers typically contain 3 to 14% by mass 5-ethylidene-2-norbornene. These polymers comply with the aforementioned requirements for the double bonds, i.e., falling within the range of 0.01 to 1.0 equivalent in 100 g of the polymer. Also, partially hydrogenated ethylene based unsaturated polymers (for example, polybutadiene), which include at least about 50% hydrogenated double bonds, are suitable. Exemplary polymer blends may vary widely. Blends of EPDM and 20 to 40% polybutadiene, blends of EPDM and 20 to 40% poly(octenamer), and blends of polybutadiene and saturated polyolefin at 50/50 are particularly preferred.

Thermoplastic Resin Having Carbon-Carbon Double Bonds Substantially in Only the Main Chain Among the aforementioned unsaturated hydrocarbon polymers, in light of very superior oxygen scavenging properties and possibility to be included in the resin composition of the inner liner, thermoplastic resins having carbon-carbon double bonds substantially in only the main chain (hereinafter, may be also referred to as merely "thermoplastic resin having double bonds"), except for those having a molecular weight of no greater than 1,000 and having conjugated double bonds, are particularly preferred. In this regard, thermoplastic resin "having carbon-carbon double bonds substantially in only the main chain" as referred to herein means that the carbon-carbon double bonds existing in the main chain of the thermoplastic resin account for no less than 90% of all the carbon-carbon double bonds included in the main chain or side chain of the molecule. The carbon-carbon double bonds existing in the main chain account for preferably no less than 93%, and more preferably no less than 95%.

Since the thermoplastic resin having double bonds has carbon-carbon double bonds in the molecule thereof, it can efficiently react with oxygen, whereby superior oxygen scavenging ability can be achieved. By including such a thermoplastic resin in the resin composition, the gas barrier properties of the inner liner can be significantly improved. The carbon-carbon double bond involves conjugated double bonds, but does not involve multiple bonds included in an aromatic ring.

The lower limit of the content of the carbon-carbon double bond included in the thermoplastic resin having double bonds is preferably 0.001 equivalent/g, more preferably 0.005 equivalent/g, and still more preferably 0.01 equivalent/g. On the other hand, the upper limit of the content of the carbon-carbon double bond is preferably 0.04 equivalent/g, more preferably 0.03 equivalent/g, and still more preferably 0.02 equivalent/g. When the content of the carbon-carbon double bond is less than the lower limit described above, the inner liner obtained may have insufficient oxygen scavenge function. To the contrary, when the content of the carbon-carbon double bonds is beyond the upper limit described above, coloring of the resin composition may be significant, whereby the appearance of the inner liner obtained may be deteriorated.

As described in the foregoing, the thermoplastic resin having double bonds is, due to having carbon-carbon double bonds substantially in only the main chain, accompanied by significantly less generation of decomposed matter having a low molecular weight yielded upon cleavage of side chain double bonds by way of a reaction with oxygen. Although a part of the decomposed matter having a low molecular weight is an unpleasant odor substance, development of unpleasant odor can be minimized as such decomposed matter is less likely to be generated. Therefore, by including such a thermoplastic resin in the resin composition, an inner liner can be provided having superior gas barrier properties and durability, while avoiding from development of unpleasant odor, by means of the oxygen scavenge. In this respect, when a thermoplastic resin having many of the carbon-carbon double bonds in the side chain is used, oxygen scavenging properties may be satisfactory; however, decomposed matter is generated upon cleavage of the double bonds in the side chain as described above. Thus, unpleasant odor is developed, whereby a surrounding environment may be significantly compromised.

In the thermoplastic resin having double bonds, when the carbon-carbon double bond in the main chain reacts with oxygen, oxidization occurs at a site of an allyl carbon (carbon adjacent to the double bond); therefore, the allyl carbon is preferably other than quaternary carbon. Furthermore, since it would be possible to generate decomposed matter having a low molecular weight when the main chain is cleaved, the allyl carbon is preferably unsubstituted carbon, i.e., a methylene carbon in order to prevent this event. From the foregoing respects, the thermoplastic resin having double bonds preferably has at least one of units represented by the following formulae (XIV) and (XV).

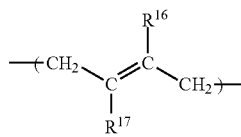

(XIV)

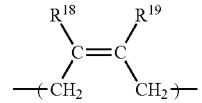

(XV)

In the above formulae (XIV) and (XV), $R^{16}$, $R^{17}$, $R^{18}$ and $R^{19}$ each independently represent a hydrogen atom, an alkyl group which may have a substituent, an aryl group which may have a substituent, an alkylaryl group which may have a substituent, —$COOR^{20}$, —$OCOR^{21}$, a cyano group or a halogen atom; $R^{18}$ and $R^{19}$ may form a ring by way of a methylene group or an oxymethylene group, unless $R^{18}$ and $R^{19}$ both represent a hydrogen atom; $R^{20}$ and $R^{21}$ represent an alkyl group which may have a substituent, an aryl group which may have a substituent or an alkylaryl group which may have a substituent.

When $R^{16}$, $R^{17}$, $R^{18}$ and $R^{19}$ represent an alkyl group, the alkyl group has preferably 1 to 5 carbon atoms; when they represent an aryl group, the aryl group has preferably 6 to 10 carbon atoms; and when they represent an alkylaryl group, the alkylaryl group has preferably 7 to 11 carbon atoms. Specific examples of the alkyl group include a methyl group, an ethyl group, a propyl group and a butyl group; specific examples of the aryl group include a phenyl group; examples of the alkylaryl group include a tolyl group; and examples of the halogen atom include a chlorine atom.

The substituent which may be included in the thermoplastic resin having double bonds is exemplified by various types of hydrophilic groups. The hydrophilic group as referred to herein is exemplified by a hydroxyl group, an alkoxy group having 1 to 10 carbon atoms, an amino group, an aldehyde group, a carboxyl group, a metal carboxylate group, an epoxy group, an ester group, a carboxylic anhydride group, a boronic acid group, a boron-containing group that can be converted into a boronic acid group in the presence of water (for example, boronic acid ester group, a boronic acid anhydride group, a boronic acid salt group, etc.), and the like. Among these hydrophilic groups, an aldehyde group, a carboxyl group, a metal carboxylate group, an epoxy group, an ester group, a carboxylic anhydride group, a boronic acid group, a boron-containing group that can be converted into a boronic acid group in the presence of water are preferred in terms of ability to react with a hydroxyl group, etc., of EVOH. When the thermoplastic resin having double bonds includes such a hydrophilic group, the thermoplastic resin has elevated dispersibility in the resin composition, thereby leading to improvement of the oxygen scavenging function of the inner liner obtained. In addition, along with this phenomenon, the interlayer adhesiveness is improved as a result of formation of a chemical bond through a reaction of this hydrophilic group with a hydroxyl group, a functional group or the like of EVOH in the adjacent layer, and characteristics such as gas barrier properties and durability of the resultant inner liner are further improved.

In addition, of the thermoplastic resins having double bonds described in the foregoing, compounds having the unit represented by the above formulae (XIV) and (XV), wherein $R^{16}$, $R^{17}$, $R^{18}$ and $R^{19}$ all represent a hydrogen atom are particularly preferred in light of prevention of the odor. Although the reason for the prevention is not necessarily clarified, it is presumed that when $R^{16}$, $R^{17}$, $R^{18}$ and $R^{19}$ represent not a hydrogen atom but a group listed, the group may be oxidized and cleaved to convert into an odor substance, when the thermoplastic resin reacts with oxygen.

In the thermoplastic resin having double bonds, the unit represented by the above formula (XIV) and (XV) is preferably a unit derived from a diene compound. When the unit is derived from a diene compound, the thermoplastic resin having such a structural unit can be readily produced. The diene compound is exemplified by isoprene, butadiene, 2-ethylbutadiene, 2-butylbutadiene, chloroprene, and the like. Only one of these may be used alone, or a plurality of types thereof may be used in combination. Examples of the thermoplastic resin having double bonds that includes such a unit derived from a diene compound include polybutadiene, polyisoprene, polychloroprene, polyoctenylene, and the like. Of these, polybutadiene and polyoctenylene are particularly preferred in light of particularly superior oxygen scavenging function. Alternatively, a copolymer including as a copolymerization component a structural unit other than the aforementioned structural units can be used also as the thermoplastic resin having double bonds. The copolymerization component is exemplified by styrene, acrylonitrile, propylene, and the like. When the thermoplastic resin having double bonds is such a copolymer, the content of the units represented by the above formulae (XIV) and (XV) is preferably no less than 50 mol %, and more preferably no less than 70 mol % in terms of the total number of the units with respect to all structural units of the thermoplastic resin.

The lower limit of the number average molecular weight of the thermoplastic resin having double bonds is preferably 1,000, more preferably 5,000, still more preferably 10,000, and particularly preferably 40,000. On the other hand, the upper limit of the number average molecular weight is preferably 500,000, more preferably 300,000, still more preferably 250,000, and particularly preferably 200,000. When the thermoplastic resin having double bonds has a molecular weight of less than 1,000, or greater than 500,000, the inner liner obtained may be involved in inferior molding processability and handling quality, and mechanical properties of the inner liner such as strength and extensibility may be deteriorated. Moreover, the dispersibility in the resin composition is lowered, and as a result, gas barrier properties and oxygen scavenging performance of the inner liner may be deteriorated. The thermoplastic resin having double bonds may be used of one type or a plurality of types thereof.

The method for producing the thermoplastic resin having carbon-carbon double bonds substantially in only the main chain as described above may vary depending on the type of the thermoplastic resin, and for example, polybutadiene (cis-1,4-polybutadiene) can be synthesized using a cobalt based or nickel based catalyst as a catalyst. Specific examples of the catalyst include a combination of a CoCl2·2C5H5N complex and diethylaluminum chloride, and the like. The solvent which may be used includes an inert organic solvent, and in particular, a hydrocarbon having 6 to 12 carbon atoms such as e.g., an aliphatic hydrocarbon such as hexane, heptane, octane or decane, or an aromatic hydrocarbon such as toluene, benzene or a xylene is suitable. The polymerization is usually carried out at a temperature falling within the range of −78° C. to 70° C. for a time period falling within the range of 1 to 50 hrs.

It is to be noted that the carbon-carbon double bonds that exist after completing the polymerization may be reduced by hydrogen in part in the range not to impair the mechanical properties of the inner liner, and effects such as gas barrier properties and oxygen scavenging performance, and the like. In this procedure, it is preferred that in particular, the carbon-carbon double bonds remaining in the side chain, in particular, are selectively reduced by hydrogen.

Transition Metal Salt

The resin composition preferably contains in addition to the aforementioned unsaturated hydrocarbon polymer (including the thermoplastic resin having double bonds), further a transition metal salt (other than the metal salts described above). When such a transition metal salt is included together with the unsaturated hydrocarbon polymer, the oxygen scavenging function of the inner liner obtained can be further improved, and as a result, further superior gas barrier properties can be provided. This event is believed to result from acceleration by the transition metal salt, of the reaction of the unsaturated hydrocarbon polymer with oxygen present inside of the inner liner or oxygen going to permeabilize in the inner liner.

A transition metal ion that constitutes the transition metal salt is exemplified by each ion of iron, nickel, copper, manganese, cobalt, rhodium, titanium, chromium, vanadium ruthenium, or the like, but not limited thereto. Of these, each ion of iron, nickel, copper, manganese or cobalt is preferred, each ion of manganese or cobalt is more preferred, and cobalt ion is particularly preferred.

A counter anion of the transition metal ion that constitutes the transition metal salt is exemplified by a carboxylic acid ion or a halogen anion, and the like. Specific examples of the counter anion include: anions generated by ionization of a hydrogen ion from acetic acid, stearic acid, acetylacetone, dimethyldithiocarbamic acid, palmitic acid, 2-ethylhexanoic acid, neodecanoic acid, linoleic acid, tol acid, oleic acid, resin acid, capric acid, naphthenoic acid or the like; a chloride ion and an acetylacetonate ion, and the like, but not limited thereto. Specific examples of particularly preferred transition metal salts are cobalt 2-ethylhexanoate, cobalt neodecanoate and cobalt stearate. Also, the transition metal salt may have a polymeric counter anion, and thus may be an ionomer, as generally referred to.

The lower limit value of the content of the transition metal salt is in terms of metal element equivalent, preferably 1 ppm, more preferably 5 ppm, and still more preferably 10 ppm with respect to the resin composition. On the other hand, the upper limit value of the content of the transition metal salt is preferably 50,000 ppm, more preferably 10,000 ppm, and still more preferably 5,000 ppm. The content of the transition metal salt is less than the lower limit described above, the oxygen scavenge effect of the inner liner obtained may be insufficient. On the other hand, when the content of the transition metal salt is beyond the upper limit described above, the thermal stability of the resin composition is deteriorated, whereby generation of decomposed gases, and gel and/or seed may be significantly developed.

Desiccant

Other component contained in the resin composition that constitutes the layer A and layer B is exemplified by a desiccant. The desiccant may be particularly suitably used also when the resin composition that constituted the layer B contains the adhesive resin. The desiccant may be contained in either one of the resin composition that constitutes the layer A or the layer B, it is preferably contained in the resin composition of the layer A.

The desiccant is a substance that absorbs moisture and is capable of eliminating the moisture from a given environment. The desiccant which may be contained in the resin composition of the inner liner is not particularly limited as long as it has such properties. When the resin composition of the resin-layer contains the desiccant, gas barrier properties of the resin-layer containing the gas barrier resin can be maintained at a high level since a dry state is maintained.

Examples of suitable desiccants include, hydrate formative salts, i.e., salts that absorb moisture in the form of water of crystallization, in particular, phosphoric acid salts and particularly anhydrides thereof in light of the aforementioned effects, as well as other hydrate formative salts such as e.g., salts such as sodium borate and sodium sulfate, and particularly anhydrides of the same. Alternatively, other moisture absorptive compound such as e.g., sodium chloride, sodium nitrate, sugar, silica gel, bentonite, molecular sieves, a high-water-absorbing resin or the like may be also used. These may be used either alone or a plurality of types thereof.

The desiccant is preferably dispersed in the form of fine particles in a matrix of the resin-layer including the resin having gas barrier properties. In particular, it is advantageous that a volume-surface mean diameter of the particles having a longitudinal diameter of no less than 10 μm of the desiccant particles is no greater than 30 μm, suitably 25 μm, and most suitably no greater than 20 μm, whereby an inner liner having a high level of gas barrier properties which have not been achievable so far can be obtained owing to a finely dispersed state formed. The composition having such a finely dispersed state can be attained, provided that especial processing methods to meet needs are carefully combined.

The ratio of the resin having gas barrier properties constituting the resin-layer to the desiccant used is not particularly limited, and the mass ratio preferably falls within the range of 97:3 to 50:50, and particularly 95:5 to 70:30.

In connection with the desiccant particles in the resin composition that constitutes the resin-layer, the volume-surface mean diameter of the particles having a longitudinal diameter of no less than 10 μm has great influences on the gas barrier properties of the inner liner that includes the resin composition in its layer(s). Although the reason for this phenomenon is not necessarily clarified, it is presumed that particles having a large particle size have particularly disadvantageous effects on moisture absorption effects or the gas barrier properties of the resin having gas barrier properties.

Of the desiccants described above, phosphoric acid salts that can form a hydrate are particularly preferred. Since many phosphoric acid salts can form a hydrate containing a plurality of water molecules in the form of crystals of water, the mass of water absorbed per unit mass is great, thereby capable of significantly contributing to improvement of the gas barrier properties of the inner liner. In addition, since the number of molecules of water of crystallization capable of including the phosphoric acid salt is likely to increase stepwise in accordance with elevation of the humidity, the moisture can be gradually absorbed according to the variation of the humidity in the environment.

Illustrative examples of the phosphoric acid salt include sodium phosphate ($Na_3PO_4$), trilithium phosphate ($Li_3PO_4$), disodium hydrogen phosphate ($Na_2HPO_4$), sodium dihydrogen phosphate ($NaH_2PO_4$), sodium polyphosphate, lithium phosphate, dilithium hydrogen phosphate, lithium dihydrogen phosphate, lithium polyphosphate, potassium phosphate, dipotassium hydrogen phosphate, potassium dihydrogen phosphate, disodium hydrogen phosphate, potassium polyphosphate, calcium phosphate ($Ca_3(PO_4)_2$), calcium hydrogen phosphate ($CaHPO_4$), calcium dihydrogen phosphate ($Ca(H_2PO_4)_2$), calcium polyphosphate, ammonium phosphate, diammonium hydrogen phosphate, ammonium dihydrogen phosphate, ammonium polyphosphate, and the like. The polyphosphate as herein referred to includes diphosphates (pyrophosphoric acid salts), triphosphates (tripolyphosphoric acid salts), and the like. Of these phosphoric acid salts, anhydrides not containing water of crystallization are suitable. Also, sodium phosphate, disodium hydrogen phosphate, and sodium dihydrogen phosphate are suitable.

The phosphoric acid salts are usually in the form of powder. Commercially available powders of phosphoric acid salts generally have a mean particle diameter of 15 to 25 μm, and the size of maximum particles included is 40 to 100 μm. If a powder including such large particles is used, the gas barrier properties of the resin-layer of the inner liner may be insufficient. When particles having a size greater than the thickness of the resin-layer of the inner liner are included, gas barrier properties may be significantly impaired. Therefore, the particle size of the phosphoric acid salt powder is preferably no greater than the thickness of the resin-layer of the inner liner.

In other words, the phosphoric acid salt powder preferably has a mean particle diameter of no greater than 10 μm. The mean particle diameter is more preferably no greater than 1 μm. The mean particle diameter may be determined by, for example, a light scattering method or the like using a particle size analyzer.

When the phosphoric acid salt is used as a desiccant, it is preferably blended together with a dispersant. When such a dispersant is blended, the phosphoric acid salt as a desiccant can be favorably dispersed in the resin composition containing a resin having gas barrier properties. Examples of the dispersant include, fatty acid salts, glycerin fatty acid esters, fatty acid amides, and the like. It is to be noted that glycerin esters of aromatic carboxylic acids are generally in the form of a liquid at room temperature, and thus are not suited for dry blending with a phosphoric acid salt.

The fatty acid salt is exemplified by calcium stearate, zinc stearate, magnesium stearate, and the like. The glycerin fatty acid ester is exemplified by glycerin monostearic acid ester, monodecanoyl octanoyl glyceride, and the like. The fatty acid amide is exemplified by ethylene bisstearic acid amide, and the like.

Of these dispersants, a fatty acid salt is suitably used in light of improvement of slipping properties of the phosphoric acid salt powder, and prevention of clogging of a screen of an extruder during melt kneading. In particular, a calcium salt, a zinc salt, and the like are suitable. Furthermore, in light of achievement of particularly favorable dispersibility, a glycerin fatty acid ester is suitably used. In particular, a mono- or di-fatty acid ester of glycerin is preferred, glycerin monofatty acid ester is more preferred, and glycerin monostearic acid ester is particularly preferred.

Moreover, the dispersant is preferably constituted with a compound having 8 to 40 carbon atoms. Due to having the number of carbon atoms falling within this range, favorable dispersibility can be achieved. The lower limit value of suitable number of carbon atoms is 12, and the upper limit value of suitable number of carbon atoms is 30.

The amount of the dispersant blended is 1 to 20 parts by mass with respect to 100 parts by mass of the phosphoric acid salt. When the content of the dispersant is less than 1 part by mass with respect to 100 parts by mass of the phosphoric acid salt, prevention of generation of aggregates of the phosphoric acid salt may fail. The content of the dispersant is suitably no less than 2 parts by mass, and more suitably no less than 3 parts by mass. On the other hand, when the content of the dispersant is greater than 20 parts by mass with respect to 100 parts by mass of the phosphoric acid salt, the slippage of the pellet of the resin composition becomes so great to result in difficulty in feeding to the extruder, whereby the interlayer adhesive force is impaired in producing the inner liner. The content of the dispersant is suitably no greater than 15 parts by mass, and more suitably no greater than 10 parts by mass.

Relationship Between Layer A and Layer B

In the inner liner, the interlayer adhesive force between the layer A and the layer B that are adjacent with each other is preferably no less than 450 g/15 mm, more preferably no less than 500 g/15 mm, even more preferably no less than 600 g/15 mm, still more preferably no less than 700 g/15 mm, and particularly preferably no less than 800 g/15 mm. When the interlayer adhesive force between the layer A and the layer B falls within the range described above, very favorable interlayer adhesiveness can be provided, whereby superior characteristics of the inner liner such as gas barrier properties can be maintained even against deformation such as stretching or flexion, and thus very superior durability can be attained. In this regard, the interlayer adhesive force between the layer A and the layer B as referred to herein means a value (unit: g/15 mm) of T-peel strength between the layer A and the layer B as determined with a measurement sample having a width of 15 mm using an autograph in an atmosphere of 23° C. and 50% RH under a condition involving a tension rate of 250 mm/min.

With regard to the interlayer relationship of the inner liner, it is desired that a binding reaction is allowed to be actively involved at the interface between the layer A and the layer B. By causing a bond forming reaction between the resin having gas barrier properties in the resin composition of the layer A and the elastomer in the resin composition of the layer B due to the metal salt included as described above, more superior interlayer adhesiveness can be achieved. Exemplary bond forming reactions include: a hydroxyl group exchange reaction that occurs between a carbamate group of TPU, an amino group of polyamide or the like with a hydroxyl group or the like of the resin having gas barrier properties; an addition reaction of a hydroxyl group or the like of the resin having gas barrier properties to a remaining isocyanate group in TPU; an amide producing reaction of a terminal carboxyl group of polyamide with a hydroxyl group of EVOH; as well as other binding reaction that is involved between the resin having gas barrier properties and the adhesive resin, and the like. As a result, the gas barrier properties, durability and the like of the inner liner can be further improved.

Method for Producing Inner Liner

The method for producing an inner liner is not particularly limited as long as the method can favorably laminate and adhere the layer A and the layer B, and any of well-known methods such as e.g., coextrusion, pasting, coating, bonding, and attaching may be employed. The method for producing an inner liner is specifically exemplified by (1) a method for producing an inner liner having a layer A and a layer B by a multilayer coextrusion process using a resin composition for the layer A containing a resin having gas barrier properties such as EVOH, and a resin composition for the layer B containing an elastomer, (2) a method for producing an inner liner having a layer A and a layer B, the method including: producing first a laminate including a layer that will be the layer A and a layer that will be the layer B by a coextrusion process using a resin composition for the layer A containing a resin having gas barrier properties such as EVOH and a resin composition for the layer B containing an elastomer; overlaying a plurality of laminates via an adhesive; and stretching, and the like. Among these, in light of superior productivity, and excellent interlayer adhesiveness, (1) the method of molding by a multilayer coextrusion process using a resin composition containing a resin having gas barrier properties such as EVOH and a resin composition containing an elastomer is preferred.

In the multilayer coextrusion process, the inner liner is molded by: heat melting the resin composition of the layer A and the resin composition of the layer B; supplying the melted resin compositions into an extrusion die from each distinctive extruder and pump through each channel; extruding from the extrusion die to give a multilayer; and thereafter allowing for lamination and adhesion. As the extrusion die, for example, a multimanifold die, a field block, a static mixer, or the like may be used.

In the inner liner, it is preferred to further improve the interlayer adhesiveness between the layer A and the layer B through irradiating thus resulting multilayer laminate with an active energy ray to promote a crosslinking reaction of resins of the layer A and the layer B. The inner liner can have enhanced gas barrier properties and flex resistance as a result of increased interlayer adhesiveness due to the irradiation with an active energy ray in this manner.

The active energy ray as referred to means rays having an energy quantum among electromagnetic waves and charged particle rays, and specifically, ultraviolet rays, γ-rays, electron beams and the like. Among these active energy rays, electron beams are preferred in light of effects of improving the interlayer adhesiveness. When an electron beam is used as the active energy ray, the interlayer crosslinking reaction is further promoted, and thus the interlayer adhesiveness of the inner liner can be further improved.

When irradiation with an electron beam is carried out, any of various types of electron beam accelerators such as e.g., of Cockcroft-Walton type, Van de Graaff type, resonance transformer type, insulated core transformer type, linear type, dynamitron type, and high frequency wave type may be used as an electron beam source. Typically, the irradiation is carried out at an accelerating voltage of 100 to 500 kV, and an irradiation dose falling within the range of 5 to 600 kGy.

In addition, when the irradiation is carried out with a ultraviolet ray as the active energy ray, a ultraviolet ray having a wavelength of 190 to 380 nm may be involved. A source of the ultraviolet ray is not particularly limited, and for example, a high pressure mercury lamp, a low pressure mercury lamp, a metal halide lamp, a carbon arc lamp and the like may be used.

Pneumatic Tire Having Inner Liner

The inner liner has superior gas barrier properties, stretchability and thermoformability as described above. Furthermore, the inner liner is capable of maintaining characteristics such as gas barrier properties even when used with deformation such as stretching or flexion imposed due to excellent durability such as being less likely to be accompanied by crack formation. Therefore, the inner liner is suitably used as an inner liner for pneumatic tires of various types of vehicles and the like.

Hereinafter, the pneumatic tire 1 of the present invention having the aforementioned inner liner shown in FIG. 1 will be explained. The pneumatic tire 1 includes: a pair of bead portions 2; a pair of side wall portions 3; a tread portion 4 continuously extending from the respective side wall portions 3; a carcass 5 extending in a toroidal shape across the pair of bead portions 2 to reinforce the bead portions 2, the side wall portions 3 and the tread portions 4; and a belt 6 composed of two belt layers disposed on the outer side in the radial direction of a crown portion of the carcass 5, and the inner liner 7 described above is provided on the inner face of the carcass 5.

In the pneumatic tire 1, the carcass 5 includes a main body extending in a toroidal shape across the pair of bead cores 8 respectively embedded in the bead portions 2, and a turn-up portion wound around each bead core 8 from the inner side toward the outer side in the widthwise direction of the tire and turned up toward the outer side in the radial direction. In the pneumatic tire according to the invention, the number and the structure of plies of the carcass 5 are not limited to those shown in the Figure.

Although the belt 6 is composed of two belt layers in the pneumatic tire 1, the number of the belt layers constituting the belt 6 is not limited thereto. Each belt layer typically includes a rubber-coated layer of cords extending inclined with respect to the equatorial plane of the tire, and the two belt layers are laminated such that the cords constituting the respective belt layers cross with each other over the equatorial plane of the tire to form the belt 6. Further, the pneumatic tire 1 includes a belt reinforcing layer 9 disposed on the outer side of the belt 6 in the radial direction of the tire to cover the entirety belt 6; however, it is acceptable not to dispose the belt reinforcing layer 9, or to replace the belt reinforcing layer 9 with another belt reinforcing layer having a different structure. In the present embodiment, the belt reinforcing layer 9 is usually composed of a rubber-coated layer of cords arranged substantially in parallel with the circumferential direction of the tire.

The inner liner 7 in the pneumatic tire 1 is a multilayered structure having no less than 8 resin-layers as described above, and thus has superior characteristics such as gas barrier properties and durability. Therefore, the pneumatic tire 1 having the inner liner 7 is excellent in internal pressure retainability, and also is accompanied by reduced rack formation in the inner liner 7.

In the pneumatic tire 1, ambient air or air of which oxygen partial pressure has been changed, or an inert gas such as nitrogen may be used as a gas to be filled in the tire.

The structure of the pneumatic tire is not particularly limited and may be modified in various modes as long as the tire includes the inner liner configured as described above. The pneumatic tire can be suitably applied to tires for passenger vehicles, large tires, off-the-road tires, tires for motorcycles, tires for airplanes, tires for agricultural vehicles, and the like.

Other Embodiments

The inner liner of the present invention is not limited to the foregoing embodiments. For example, other layer may be included in addition to the layer A and the layer B. The type of the resin composition that may constitute the other layer is not particularly limited, but preferably has strong adhesiveness with the layer A and/or the layer B. As the other layer, one having a hydroxyl group or the like included in the resin having gas barrier properties in the layer A, or having a molecular chain including a functional group that generates a bond via a reaction with a functional group (e.g., a carbamate group or an isocyanate group in the molecular chain of TPU) in the layer B is particularly preferred.

In addition, the inner liner of the present invention may have a supporting layer laminated on either one or both faces of the aforementioned laminate having no less than 8 resin-layers. The supporting layer is not particularly limited, which may not be a resin layer, and for example, a general synthetic resin layer, a synthetic resin film or the like may be used. Also, laminating means of the supporting layer is not particularly limited, and for example, adhesion by an adhesive, extrusion lamination, or the like may be employed.

EXAMPLES

Hereinafter, the present invention will be explained more specifically by way of Examples, but the present invention is not limited to the following Examples.

Production Example 1

Production of EVOH 1

Into a polymerization tank equipped with a cooling device and a stirrer were charged 20,000 parts by mass of vinyl acetate, 1,020 parts by mass of methanol, 3.5 parts by mass of 2,2'-azobis-(4-methoxy-2,4-dimethylvaleronitrile) as a polymerization initiator, and replacement with nitrogen was carried out while stirring. Thereafter, ethylene was introduced thereto, followed by adjusting the internal temperature to 60° C. and the ethylene pressure to 59 Kg/cm$^2$, and the temperature and the pressure were kept for 4 hrs while stirring to permit polymerization. Next, sorbic acid (SA) in an amount of 10 parts by mass (0.05% by mass with respect to vinyl acetate charged) was dissolved in methanol to prepare a 1.5% by mass solution, which was added to the polymerization tank. The degree of polymerization was 30% with respect to vinyl acetate charged. The copolymerization reaction liquid was supplied to the purge column, and after unreacted vinyl acetate was eliminated from the top of the tower by introduction of methanol steam from the bottom of the tower, a 40% by mass methanol solution of the copolymer was obtained. The copolymer had a content of ethylene units of 44.5 mol %, and a content of vinyl acetate units of 55.5 mol %.

A methanol solution of the copolymer was introduced into a saponification reaction vessel, and then a sodium hydroxide/methanol solution (85 g/L) was added so as to attain 0.5 equivalent with respect to the vinyl acetate component in the copolymer. Thereto was further added methanol to adjust the copolymer concentration of 15% by mass. The temperature in the reaction vessel was elevated to 60° C., and the reaction was allowed while blowing nitrogen gas into the reaction vessel for 5 hrs. Thereafter, the reaction was stopped by neutralizing with acetic acid, and the content was removed from the reaction vessel and was allowed for deposition in a particulate form by leaving to stand at ordinary temperature. An operation including deliquoring deposited particles with a centrifugal separator and further adding a large amount of water followed by deliquoring was repeated to obtain EVOH 1 having a saponification degree of 99.5% (density: 1.19 g/cm$^3$). EVOH 1 had a melting point of 165° C.

Production Example 2

Production of EVOH 2

Into a polymerization tank equipped with a cooling device and a stirrer were charged 20,000 parts by mass of vinyl acetate, 1,020 parts by mass of methanol, 3.5 parts by mass of 2,2'-azobis-(4-methoxy-2,4-dimethylvaleronitrile) as a polymerization initiator, and replacement with nitrogen was carried out while stirring. Thereafter, ethylene was introduced thereto, followed by adjusting the internal temperature to 60° C. and the ethylene pressure to 59 Kg/cm$^2$, and the temperature and the pressure were kept for 4 hrs while stirring to permit polymerization. Next, sorbic acid (SA) in an amount of 10 parts by mass (0.05% by mass with respect to vinyl acetate charged) was dissolved in methanol to prepare a 1.5% by mass solution, which was added to the polymerization tank. The degree of polymerization was 30% with respect to vinyl acetate charged. The copolymerization reaction liquid was supplied to the purge column, and after unreacted vinyl acetate was eliminated from the top of the tower by introduction of methanol steam from the bottom of the tower, a 40% by mass methanol solution of the copolymer was obtained. The copolymer had a content of ethylene units of 44.5 mol %, and a content of vinyl acetate units of 55.5 mol %.

A methanol solution of the copolymer was introduced into a saponification reaction vessel, and then a sodium hydroxide/methanol solution (85 g/L) was added so as to attain 0.5 equivalent with respect to the vinyl acetate component in the copolymer. Thereto was further added methanol to adjust the copolymer concentration of 15% by mass. The temperature in the reaction vessel was elevated to 60° C., and the reaction was allowed while blowing nitrogen gas into the reaction vessel for 5 hrs. Thereafter, the reaction was stopped by neutralizing with acetic acid, and the content was removed from the reaction vessel and was allowed for deposition in a particulate form by leaving to stand at ordinary temperature. An operation including deliquoring deposited particles with a centrifugal separator and further adding a large amount of water followed by deliquoring was repeated to obtain EVOH having a saponification degree of 99.5%.

Using EVOH obtained as described above, epoxypropane was allowed to react with EVOH by means of a biaxial extruder "TEM-35BS" (37 mmφ, L/D=52.5) manufactured by Toshiba Machine Co., Ltd. under the extrusion conditions as in the following while adding a catalyst. Unreacted epoxypropane was eliminated from a vent, and then a 8.2% by mass aqueous ethylenediamine tetraacetate trisodium hydrate solution was added as a catalyst quencher to permit pelletization, followed by drying to give an epoxypropane-modified ethylene-vinyl alcohol copolymer EVOH 2 (density: 1.13 g/cm$^3$) having the following structure as a structural unit (II) other than the ethylene unit and the vinyl alcohol unit.

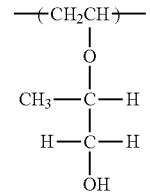

Cylinder, die temperature settings:
resin feed port/cylinder part inlet/adaptor/die=160/200/240/240 (° C.)
Number of revolution of screw: 400 rpm
Ethylene-vinyl alcohol copolymer feed rate: 16 kg/hr
Epoxypropane feed rate: 2.4 kg/hr (pressure during feeding: 6 MPa)
Catalyst solution feed rate: 0.32 kg/hr
Preparation of catalyst: Zinc acetylacetonato monohydrate in an amount of 28 parts by mass in was mixed with 957 parts by mass of 1,2-dimethoxyethane to give a mixed solution. To thus resulting mixed solution were added 15 parts by mass of trifluoromethane sulfonic acid while stirring, whereby a catalyst solution was obtained. In other words, 1 mol of trifluoromethane sulfonic acid was added to 1 mol of zinc acetylacetonato monohydrate to prepare a mixed solution.
Aqueous Catalyst Quencher Solution Feed Rate: 0.16 Kg/Hr
The amount of the structural unit (II) other than the ethylene unit and the vinyl alcohol unit of EVOH 2 introduced (amount of modification of epoxybutane) was, as determined by $^1$H-NMR (internal standard substance: tetramethylsilane; solvent: d6-DMSO) was 5.8 mol %. In addition, EVOH 2 had a melting point of 106° C.

In the following Comparative Examples, EVAL™ F171 manufactured by Kuraray Co., Ltd. was used as EVOH 3.

In the following Production Examples 3 to 7, the outflow-starting temperature and the melt viscosity of the resultant TPU were determined in accordance with the following method.

Outflow-Starting Temperature

A polymer outflow rate was measured using a Koka-type flow tester (constant pressure flow tester) in accordance with a temperature-rising method with an each increase of the temperature of 3° C. (nozzle; pore size: 1 mm, pore length:

10 mm; load: 100 kgf; rate of temperature rise: 5° C./min). The polymer outflow rate was plotted with respect to the temperature within the range of $1\times10^{-3}$ to $5\times10^{-3}$ ml/sec, and the temperature at which the outflow rate became 0 ml/sec was determined in accordance with an extrapolation method. Thus obtained temperature was defined as an outflow-starting temperature.

Melt Viscosity

A melt viscosity of TPU which had been dried at 80° C. for 2 hrs under reduced pressure (no higher than $1.3\times10^3$ Pa (10 Torr)) was measured using a Koka-type flow tester manufactured by Shimadzu Corporation under a condition with a load of 490.3 N (50 kgf) using a nozzle dimension having a diameter of 1 mm and a length of 10 mm, at a temperature of 200° C.

Production Example 3

Production of TPU 1

Polytetramethylene ether glycol (PTMEG) having a number average molecular weight of 1,000, 1,4-butanediol (1,4-BD) and 4,4'-diphenylmethanediisocyanate (MDI) were continuously fed at a molar ratio of PTMEG: 1,4-BD: MDI being 1.0:1.2:2.2 such that the total feed rate of these materials became 200 g/min to an anterior region of a heating zone of a coaxially rotating biaxial screw type extruder (30 mmφ, L/D=36; having a heating zone that includes three regions of an anterior region, a middle region and a posterior region), and subjected to continuous melt polymerization at 260° C. The resultant melt was continuously extruded into water to give a strand, and then cut using a pelletizing machine. The pellet thus obtained was dried through dehumidification at 60° C. for 12 hrs to produce TPU 1. Thus obtained TPU 1 had a melt viscosity of 1,080 Pa·s, and an outflow-starting temperature of 171° C.

Production Example 4

Production of TPU 2

TPU 2 was produced in a similar manner to Production Example 3 except that the thermoplastic polyurethane composition of Production Example 3 had a ratio of PTMEG: 1,4-BD: MDI of 1.0:1.4:2.4. Thus obtained TPU 2 had a melt viscosity of 3,210 Pa·s, and an outflow-starting temperature of 185° C.

Production Example 5

Production of TPU 3

TPU 3 was produced in a similar manner to Production Example 3 except that the thermoplastic polyurethane composition of Production Example 3 had a ratio of PTMEG: 1,4-BD: MDI of 1.0:0.6:1.6. Thus obtained TPU 3 had a melt viscosity of 1,115 Pa·s, and an outflow-starting temperature of 145° C.

Production Example 6

Production of TPU 4

TPU 4 was produced in a similar manner to Production Example 3 except that the thermoplastic polyurethane composition of Production Example 3 had a ratio of PTMEG: 1,4-BD: MDI of 1.0:0.4:1.4. Thus obtained TPU 4 had a melt viscosity of 1,043 Pa·s, and an outflow-starting temperature of 123° C.

Production Example 7

Production of MAh-PE

Low-density polyethylene having a MFR of 2.4 g/10 min (190° C., under load of 2,160 g) and a density of 0.92 g/cm³ in an amount of 100 parts by mass, 12 parts by mass of maleic anhydride, and 330 parts by mass of t-butylbenzene were mixed, and a nitrogen atmosphere was provided, followed by dissolving the low-density polyethylene at 160° C. Following the dissolution, a mixture of 1.7 parts by mass of di-t-butyl peroxide and 17 parts by mass of t-butylbenzene was added thereto while stirring to permit the reaction for 2 hrs. Next, the reaction liquid was removed, and stirred at room temperature to precipitate the resin in the form of powder. Thus obtained powder was washed with acetone, followed by vacuum drying to give maleic anhydride-modified low-density polyethylene MAh-PE as a white powder. Thus obtained MAh-PE had a melting point of 105° C.

Example 1

A multilayered structure (inner liner) that included TPU 1 (outer layer)/a multilayered structure in which 9 layers of EVOH 1 (layer A) and 8 layers of TPU 1 (layer B) are alternately laminated/TPU 1 (inner layer) was produced according to the following procedure. Each resin was supplied to a coextruder in molten states at 190° C. with a 19-layered feed block to obtain a multilayered structure. The thickness of the channel of each layer was varied so as to gradually increase in the feed block from the front face side toward the middle side, whereby melts of EVOH 1 and TPU 1 that interflowed were extruded such that each layer of the extruded multilayered structure has a uniform thickness. In addition, a slit shape was designed so as to give an approximately the same thickness of the layer A and the layer B that are adjacent with each other. The laminate consisting of 19 layers in total thus obtained was maintained to have the surface temperature of 25° C., and solidified by rapid cooling on a casting drum which had been electrostatically applied. The cast film obtained by solidification by rapid cooling was subjected to compression bonding on an exfoliate paper, and then rolled. It should be noted that the channel shape and total amount of discharge were predetermined such that a time period of about 4 min elapsed from the interflow of the melts of EVOH 1 and TPU 1 until the solidification by rapid cooling on the casting drum.

As a result of observation of a cross section of the cast film obtained as described above with DIGITAL MICROSCOPE VHX-900 (manufactured by KEYENCE CORPORATION), a multilayered structure having an average thickness of each layer A and layer B being 1 μm, and an average thickness of the outer layer and the inner layer being 26 μm was revealed. It is to be noted that each thickness was an average of measurements at randomly selected nine points.

Examples 2 to 6, and Comparative Examples 1 to 3

Multilayered structures (inner liners) according to Examples 2 to 6, and Comparative Examples 1 to 3 were produced in a similar manner to Example 1 except that the resin shown in Table 1 was employed, and coextrusion was carried out at a melting temperature shown in Table 1 such that the layer A and the layer B had a thickness shown in Table 1.

In Table 1, the extensional viscosity at a stretching speed of 500 (1/sec) of each resin (resin composition) forming the layer A and the layer B, are shown together with the measurement temperature (melt temperature in coextrusion). Note that the extensional viscosity was measured using Capilograph model 1D manufactured by Toyo Seiki Seisaku-sho, Ltd.

Method for Evaluation of Characteristics of Multilayered Structure (Inner Liner)

Each of the characteristics of the multilayered structures obtained in Examples 1 to 6 and Comparative Examples 1 to 3 was evaluated according to the following method. The results of evaluation of these characteristics are shown in Table 1.

(1) Appearance of Multilayered Structure (Evaluation of Melt Moldability)

The presence/absence of flow patch, streak, and fish-eye of the multilayered structures obtained were confirmed by visual inspection. The appearance of the multilayered structures was determined according to the following criteria:

A: flow patch, streak and fish-eye being almost absent;
B: flow patch, streak and fish-eye being present but a little;
C: flow patch, streak and fish-eye being markedly present; and
D: flow patch and streak being remarkable, with a large number of fish-eyes present.

(2) Oxygen Transmission Rate of Inner Liner (Evaluation of Gas Barrier Properties)

Moisture conditioning of the inner liner obtained was carried out at 20° C. and 65% RH for 5 days, and two pieces of a sample of the conditioned inner liner were provided to measure the oxygen transmission rate using MOCON, model OX-TRAN2/20 manufactured by Modern Controls, Inc., under a condition involving 20° C. and 65% RH in accordance with a method of JIS-K7126 (isopiestic method), and the average was determined (unit: mL·20 μm/m²·day·atm).

(3) Oxygen Transmission Rate after Flexion of Inner Liner
(Evaluation of Gas Barrier Properties after Flexion)

In a similar manner to that described above, the oxygen transmission rate of the inner liner was determined in accordance with ASTM-F392-74 after repeating flexion 5,000 times using "Gelbo-Flex tester" manufactured by Rigaku Kogyo Co., Ltd.

(4) Evaluation with Laboratory Drum

The multilayered structure thus obtained was irradiated with electron beams at an irradiation dose of 200 kGy using an electron beam accelerator (Nissin High Voltage Corporation (currently Nissin Electric Co., Ltd.), trade name "Cure Tron EB200-100") at an accelerating voltage of 200 kV. Using the multilayered structure after irradiation with the electron beam as an inner liner, a pneumatic tire for passenger cars having a structure as illustrated by the cross-sectional construction shown in FIG. 1 and having a size of 195/65 R 15 was produced according to a routine method. The pneumatic tire produced as described above was run over 10,000 km at room temperature on a drum rotating at a revolution number corresponding to a speed of 80 km/h under an air pressure of 140 kPa while being pressed under a load of 6 kN. The appearance of the inner liner of the pneumatic tire after the running on the drum was visually observed to evaluate the presence/absence of cracks.

(5) Evaluation with Drum at Low Temperature

A pneumatic tire was produced in a similar manner to (4) above. The pneumatic tire produced as described above was run over 10,000 km at −30° C. on a drum rotating at a revolution number corresponding to a speed of 80 km/h under an air pressure of 140 kPa while being pressed under a load of 6 kN. The appearance of the inner liner of the pneumatic tire after the running on the drum was visually observed to evaluate the presence/absence of cracks according to the following criteria.

A: crack not found
B: crack found at no greater than three sites
D: crack found at no less than four sites

TABLE 1

|  |  | Example 1 | Example 2 | Example 3 | Example 4 | Example 5 | Example 6 |
|---|---|---|---|---|---|---|---|
| Outer layer | Resin of outer layer | TPU 1 | TPU 1 | TPU 2 | TPU 2 | TPU 3 | TPU 1 |
|  | Average thickness (μm) | 26 | 26 | 26 | 26 | 26 | 26 |
| Layer A | Resin of layer A | EVOH 1 | EVOH 1 | EVOH 1 | EVOH 1 | EVOH 1 | EVOH 2 |
|  | Average thickness of one layer(μm) | 1 | 0.5 | 1 | 0.5 | 1 | 1 |
| Layer B | Resin of layer B | TPU 1 | TPU 1 | TPU 2 | TPU 2 | TPU 3 | TPU 1 |
|  | Average thickness of one layer(μm) | 1 | 1.5 | 1 | 1.5 | 1 | 1 |
| Inner layer | Resin of inner layer | TPU 1 | TPU 1 | TPU 2 | TPU 2 | TPU 3 | TPU 1 |
|  | Average thickness (μm) | 26 | 26 | 26 | 26 | 26 | 26 |
| Extensional viscosity $\eta_A$ of resin of layer A(Pa · s) |  | 8,000 | 8,000 | 6,000 | 6,000 | 8,000 | 10,000 |
| Extensional viscosity $\eta_B$ of resin of layer B(Pa · s) |  | 7,000 | 7,000 | 3,000 | 3,000 | 3,000 | 6,000 |
| Extensional viscosity ratio $\eta_A/\eta_B$ |  | 1.143 | 1.143 | 2 | 2 | 2.667 | 1.667 |
| Measurement temperature/ Melt temperature in coextrusion (° C.) |  | 190 | 190 | 210 | 210 | 190 | 196 |
| Evaluations | Appearance (melt moldability) | A | A | A | A | A | A |
|  | Oxygen transmission rate(mL/20 μm/m² · day/atm) | 2.7 | 5.3 | 2.7 | 5.3 | 2.7 | 8.9 |
|  | Oxygen transmission rate after flexion(mL/20 μm/m² · day/atm) | 2.7 | 5.3 | 2.8 | 5.3 | 2.6 | 9.0 |
|  | Evaluation with laboratory drum (Presence/absence of cracks) | absent | absent | absent | absent | absent | absent |
|  | Evaluation with drum at low temperature (Presence/absence of cracks) | B | B | B | B | B | A |

TABLE 1-continued

|  |  | Comparative Example 1 | Comparative Example 2 | Comparative Example 3 |
|---|---|---|---|---|
| Outer layer | Resin of outer layer | TPU 4 | TPU 3 | TPU 1 |
|  | Average thickness (μm) | 26 | 26 | 26 |
| Layer A | Resin of layer A | EVOH 1 | EVOH 3 | EVOH 1 |
|  | Average thickness of one layer(μm) | 1* | 1* | 1 |
| Layer B | Resin of layer B | TPU 4 | TPU 3 | MAh-PE |
|  | Average thickness of one layer(μm) | 1* | 1* | 1 |
| Inner layer | Resin of inner layer | TPU 4 | TPU 3 | TPU 1 |
|  | Average thickness (μm) | 26 | 26 | 26 |
|  | Extensional viscosity $\eta_A$ of resin of layer A(Pa·s) | 8,000 | 11,000 | 8,000 |
|  | Extensional viscosity $\eta_B$ of resin of layer B(Pa·s) | 500 | 1,000 | 80,000 |
|  | Extensional viscosity ratio $\eta_A/\eta_B$ | 16 | 11 | 0.1 |
|  | Measurement temperature/ Melt temperature in coextrusion (° C.) | 190 | 208 | 190 |
| Evaluations | Appearance (melt moldability) | x | x | B |
|  | Oxygen transmission rate(mL/20 μm/m²·day/atm) | 15 | 13 | 3 |
|  | Oxygen transmission rate after flexion(mL/20 μm/m²·day/atm) | 50 | 40 | 3 |
|  | Evaluation with laboratory drum (Presence/absence of cracks) | somewhat present | somewhat present | present |
|  | Evaluation with drum at low temperature (Presence/absence of cracks) | C | C | C |

*Although the multilayered structure was produced for the purpose of giving an average thickness of one layer of 1 μm, measurement of the thickness failed due to severe disorder of the layered structure.

From the results shown in Table 1, it is revealed that each multilayered structure (inner liner) of Examples had superior appearance (melt moldability) and consequently was superior in gas barrier properties and gas barrier properties after flexion since the resin composition having an appropriate extensional viscosity and its ratio was used for the layer A and the layer B. In addition, it was indicated that each multilayered structure was less likely to be accompanied by crack formation when used as an inner liner.

Reference Example 1

A pneumatic tire was produced in a similar manner to (4) above except that crosslinking by irradiation with electron beams was not carried out using the multilayered structure obtained in Example 1, and subjected to the evaluation with the laboratory drum at room temperature. When the appearance of the inner liner of the pneumatic tire after the running on the drum was visually observed, crack formation occurred.

INDUSTRIAL APPLICABILITY

As in the foregoing, the inner liner for a pneumatic tire of the present invention is suitably used as an inner liner of various types of pneumatic tires as well as tires for passenger vehicles since superior characteristics such as gas barrier properties are maintained even against deformation such as stretching or flexion.

EXPLANATION OF THE REFERENCE SYMBOLS

1: pneumatic tire
2: bead portion
3: side wall portion
4: tread portion
5: carcass
6: belt
7: inner liner
8: bead core
9: belt reinforcing layer

The invention claimed is:

1. An inner liner for a pneumatic tire, the inner liner comprising a laminate comprising no less than 8 resin-layers,
the no less than 8 resin-layers having a layer A constituted with a resin composition containing a resin having gas barrier properties, and a layer B being adjacent to the layer A and constituted with a resin composition containing an elastomer,
an extensional viscosity $\eta_A$ of the resin composition of the layer A, and an extensional viscosity $\eta_B$ of the resin composition of the layer B as determined under following measurement conditions both being no less than 1,000 Pa·s, and an extensional viscosity ratio $\eta_A/\eta_B$ being no less than 0.3 and no greater than 5,
the measurement conditions including:
a temperature being greater by 25° C. than the higher melting point between a melting point of the resin composition of the layer A and a melting point of the resin composition of the layer B, the melting point corresponding to an outflow-starting temperature for a resin composition not having a melting point; and
a stretching speed being 500 (1/sec),
an average thickness of a single layer of at least one selected from the layer A and the layer B being no less than 0.01 μm and no greater than 10 μm, and the layer A and the layer B being alternately laminated,
a product $\eta_A \cdot T_A$ of the extensional viscosity $\eta_A$ of the resin composition of the layer A and the average thickness $T_A$ of the one layer thereof, and a product $\eta_B \cdot T_B$ of the extensional viscosity $\eta_B$ of the resin composition of the layer B and the average thickness $T_B$ of the one layer thereof being both no less than 2,000 Pa·s·µm and no greater than 50,000 Pa·s·µm, the resin composition of the layer A containing, as a sole polymer, the resin having gas barrier properties, the inner liner for a pneumatic tire further comprising a pair of supporting layers each being adjacently laminated on one of two faces, respectively, of the laminate comprising no less than 8 resin-layers, one of the pair of supporting layers being an innermost layer and the other one of the pair of supporting layers being an outermost layer, and the pair of supporting layers each comprising a polyurethane based thermoplastic elastomer; and wherein the resin having gas barrier properties is an ethylene-vinyl alcohol copolymer.

2. The inner liner according to claim 1, wherein a ratio $(\eta_A \cdot T_A)/(\eta_B \cdot T_B)$ of the product $\eta_A \cdot T_A$ to the product $\eta_B T_B$ is no less than 0.01 and no greater than 100.

3. The inner liner according to claim 1, wherein a thickness of the inner liner being no less than 0.1 µm and no greater than 1,000 µm.

4. The inner liner according to claim 1, wherein the content of ethylene units of the ethylene-vinyl alcohol copolymer is no less than 3 mol % and no greater than 70 mol %.

5. The inner liner according to claim 1, wherein the ethylene-vinyl alcohol copolymer has a saponification degree of no less than 80 mol %.

6. The inner liner according to claim 1, wherein
the ethylene-vinyl alcohol copolymer comprises a structural unit (I), a structural unit (II) or both structural units (I) and (II):

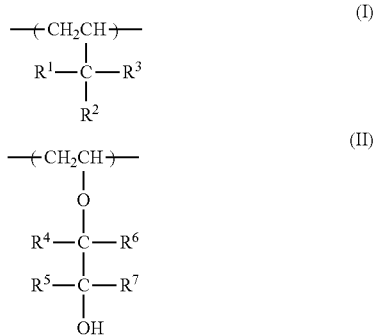

and a content of the structural unit (I) or (II) with respect to all structural units is no less than 0.5 mol % and no greater than 30 mol1%, wherein, in the formula (I), $R^1$, $R^2$ and $R^3$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group; with the proviso that two among $R^1$, $R^2$ and $R^3$ are optionally bound, unless the two both represent a hydrogen atom; and that any of $R^1$, $R^2$ and $R^3$ that is an aliphatic hydrocarbon group having 1 to 10 carbon atoms, an alicyclic hydrocarbon group having 3 to 10 carbon atoms or an aromatic hydrocarbon group having 6 to 10 carbon atoms optionally has a hydroxyl group, a carboxyl group or a halogen atom; and in the formula (II), $R^4$, $R^5$, $R^6$ and $R^7$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group; with the proviso that $R^4$ and $R^5$ or $R^6$ and $R^7$ are optionally bound, unless both $R^4$ and $R^5$ or both $R^6$ and $R^7$ represent a hydrogen atom; and that any of $R^4$, $R^5$, $R^6$ and $R^7$ that is an aliphatic hydrocarbon group having 1 to 10 carbon atoms, an alicyclic hydrocarbon group having 3 to 10 carbon atoms or an aromatic hydrocarbon group having 6 to 10 carbon atoms optionally has a hydroxyl group, an alkoxy group, a carboxyl group or a halogen atom.

7. The inner liner according to claim 1, wherein the elastomer is a polystyrene based elastomer, a polyolefin based elastomer, a polydiene based elastomer, a polyvinyl chloride based elastomer, a chlorinated polyethylene based elastomer, a polyurethane based elastomer, a polyester based elastomer, a polyamide based elastomer, a fluorine-contained resin based elastomer or a combination thereof.

8. The inner liner according to claim 1, wherein the layer A and the layer B are obtained through crosslinking by irradiation with an active energy ray.

9. The inner liner according to claim 1, wherein a binding reaction is involved at an interface between the layer A and the layer B.

10. The inner liner according to claim 1, wherein the inner liner comprises no less than 15 resin-layers.

11. The inner liner according to claim 1, wherein a total amount of a resin other than the resin having gas barrier properties, a heat stabilizer, an ultraviolet ray absorbing agent, an antioxidant, a colorant and a filler in the resin composition of the layer A is no greater than 10% by mass.

12. A pneumatic tire comprising the inner liner according to claim 8.

13. A method for producing an inner liner according to claim 1, comprising
forming the inner liner by a multilayer coextrusion process using a resin composition comprising a resin having gas barrier properties and a resin composition comprising an elastomer.

* * * * *